(12) United States Patent
Chikugo et al.

(10) Patent No.: US 10,930,948 B2
(45) Date of Patent: Feb. 23, 2021

(54) FUEL CELL SYSTEM AND METHOD FOR CONTROLLING FUEL CELL SYSTEM INCLUDING POWER RECOVERY MECHANISM

(71) Applicant: NISSAN MOTOR CO., LTD., Yokohama (JP)

(72) Inventors: Hayato Chikugo, Kanagawa (JP); Yousuke Tomita, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/086,867

(22) PCT Filed: Dec. 8, 2016

(86) PCT No.: PCT/JP2016/086635
§ 371 (c)(1),
(2) Date: Sep. 20, 2018

(87) PCT Pub. No.: WO2017/163499
PCT Pub. Date: Sep. 28, 2017

(65) Prior Publication Data
US 2019/0088962 A1 Mar. 21, 2019

(30) Foreign Application Priority Data
Mar. 22, 2016 (JP) .................. 2016-056453

(51) Int. Cl.
*H01M 8/04111* (2016.01)
*F02C 9/18* (2006.01)
(Continued)

(52) U.S. Cl.
CPC .......... *H01M 8/04111* (2013.01); *F02C 9/18* (2013.01); *H01M 8/04753* (2013.01);
(Continued)

(58) Field of Classification Search
CPC .... F02C 6/06; F02C 6/08; F02C 6/10; H01M 8/04007; H01M 2250/20; H01M 5250/40;
(Continued)

(56) References Cited

U.S. PATENT DOCUMENTS 3,976,506 A * 8/1976 Landau ................. F02C 6/00
429/414
4,838,020 A * 6/1989 Fujitsuka ............... F02C 6/10
429/423
(Continued)

FOREIGN PATENT DOCUMENTS

CA 1043860 A 12/1978
CA 2956120 A1 1/2016
(Continued)

*Primary Examiner* — Gerald L Sung
*Assistant Examiner* — Stephanie Cheng
(74) *Attorney, Agent, or Firm* — Foley & Lardner LLP

(57) ABSTRACT

A fuel cell system includes a fuel cell configured to be supplied with an anode gas and a cathode gas and generate electric power, a compressor configured to supply the cathode gas to the fuel cell, a turbine configured to be supplied with a cathode discharged gas discharged from the fuel cell and generate power, an electric motor connected to the compressor and the turbine and configured to perform power running and regeneration, a combustor disposed between the fuel cell and the turbine and configured to mix and combust the cathode gas and the anode gas, a cooler configured to cool the cathode gas that is supplied from the compressor to the fuel cell, a bypass passage configured to supply the cathode gas from an upstream side of the cooler to the combustor by bypassing the cooler and the fuel cell, and a bypass valve disposed in the bypass passage.

6 Claims, 13 Drawing Sheets

(51) Int. Cl.
*H01M 8/04746* (2016.01)
*F02C 3/22* (2006.01)
*F02C 6/10* (2006.01)
*F02C 6/00* (2006.01)
*F02C 7/22* (2006.01)
*F01D 15/10* (2006.01)
*F02C 7/141* (2006.01)
*H01M 8/04007* (2016.01)
*H01M 8/04082* (2016.01)
*H01M 8/10* (2016.01)

(52) U.S. Cl.
CPC .............. *F01D 15/10* (2013.01); *F02C 3/22* (2013.01); *F02C 6/00* (2013.01); *F02C 6/10* (2013.01); *F02C 7/141* (2013.01); *F02C 7/22* (2013.01); *F05D 2210/12* (2013.01); *F05D 2270/3032* (2013.01); *H01M 8/04074* (2013.01); *H01M 8/04201* (2013.01); *H01M 8/10* (2013.01); *H01M 2250/10* (2013.01); *H01M 2250/20* (2013.01)

(58) Field of Classification Search
CPC ..... H01M 2250/402; H01M 2250/407; H01M 8/04335; Y02E 60/56; Y02E 60/563
See application file for complete search history.

(56) References Cited

U.S. PATENT DOCUMENTS

| | | | |
|---|---|---|---|
| 6,306,532 B1 | 10/2001 | Kurita et al. | |
| 8,962,208 B2 * | 2/2015 | Mussro | H01M 8/04992 |
| | | | 429/444 |
| 2011/0097632 A1 * | 4/2011 | Sumser | F01D 15/00 |
| | | | 429/408 |
| 2017/0229721 A1 * | 8/2017 | Baika | H01M 8/04014 |

FOREIGN PATENT DOCUMENTS

| | | | | |
|---|---|---|---|---|
| JP | 06076845 A | * | 3/1994 | |
| JP | 2002042839 A | * | 2/2002 | ........ H01M 8/04425 |
| JP | 2002-270205 A | | 9/2002 | |
| JP | 2002270205 A | * | 9/2002 | |
| JP | 2004-119239 A | | 4/2004 | |
| JP | 2007-234311 A | | 9/2007 | |
| JP | 2008-078144 A | | 4/2008 | |
| JP | 2010-20924 A | | 1/2010 | |
| JP | 2014-165072 A | | 9/2014 | |

* cited by examiner

FUEL CELL SYSTEM AND METHOD FOR CONTROLLING FUEL CELL SYSTEM INCLUDING POWER RECOVERY MECHANISM

TECHNICAL FIELD

The present invention relates to a fuel cell system and a method for controlling the fuel cell system.

BACKGROUND ART

JP 2004-119239A discloses a gas turbine power generation facility that combines a solid electrolyte fuel cell (SOFC) being a kind of fuel cell and a gas turbine and includes a power recovery mechanism including a compressor configured to supply air to the SOFC and a turbine coupled to the compressor, and a combustor configured to burn discharged air and discharged gas from the fuel cell and discharge a combustion gas to the turbine.

SUMMARY OF INVENTION

The above-described gas turbine power generation facility is a system that assumes the SOFC configured to operate at relatively high temperature. In such a system of the above document, various conditions such as gas temperature largely differ from those in a fuel cell, such as a solid polymer fuel cell (PEM), that operates at relatively low temperature. Therefore, the power recovery mechanism in the above-described gas turbine power generation facility cannot be applied to a system relating to such a fuel cell that operates at relatively low temperature.

The present invention has been made in view of the above-described problem and has an object to provide a fuel cell system including a power recovery mechanism that can also be suitably applied to a low-temperature operating fuel cell, and a method for controlling such a fuel cell system.

In one aspect of the present invention, a fuel cell system is provided, which includes a fuel cell configured to be supplied with an anode gas and a cathode gas and generate electric power, a compressor configured to supply the cathode gas to the fuel cell, a turbine configured to be supplied with a cathode discharged gas discharged from the fuel cell and generate power, and an electric motor connected to the compressor and the turbine and configured to perform power running and regeneration. Furthermore, this fuel cell system further includes a combustor disposed between the fuel cell and the turbine and configured to mix and combust the cathode gas and the anode gas, a cooler configured to cool the cathode gas that is supplied from the compressor to the fuel cell, a bypass passage configured to supply the cathode gas from an upstream side of the cooler to the combustor by bypassing the cooler and the fuel cell, and a bypass valve disposed in the bypass passage.

DESCRIPTION OF EMBODIMENTS

Figure 1:
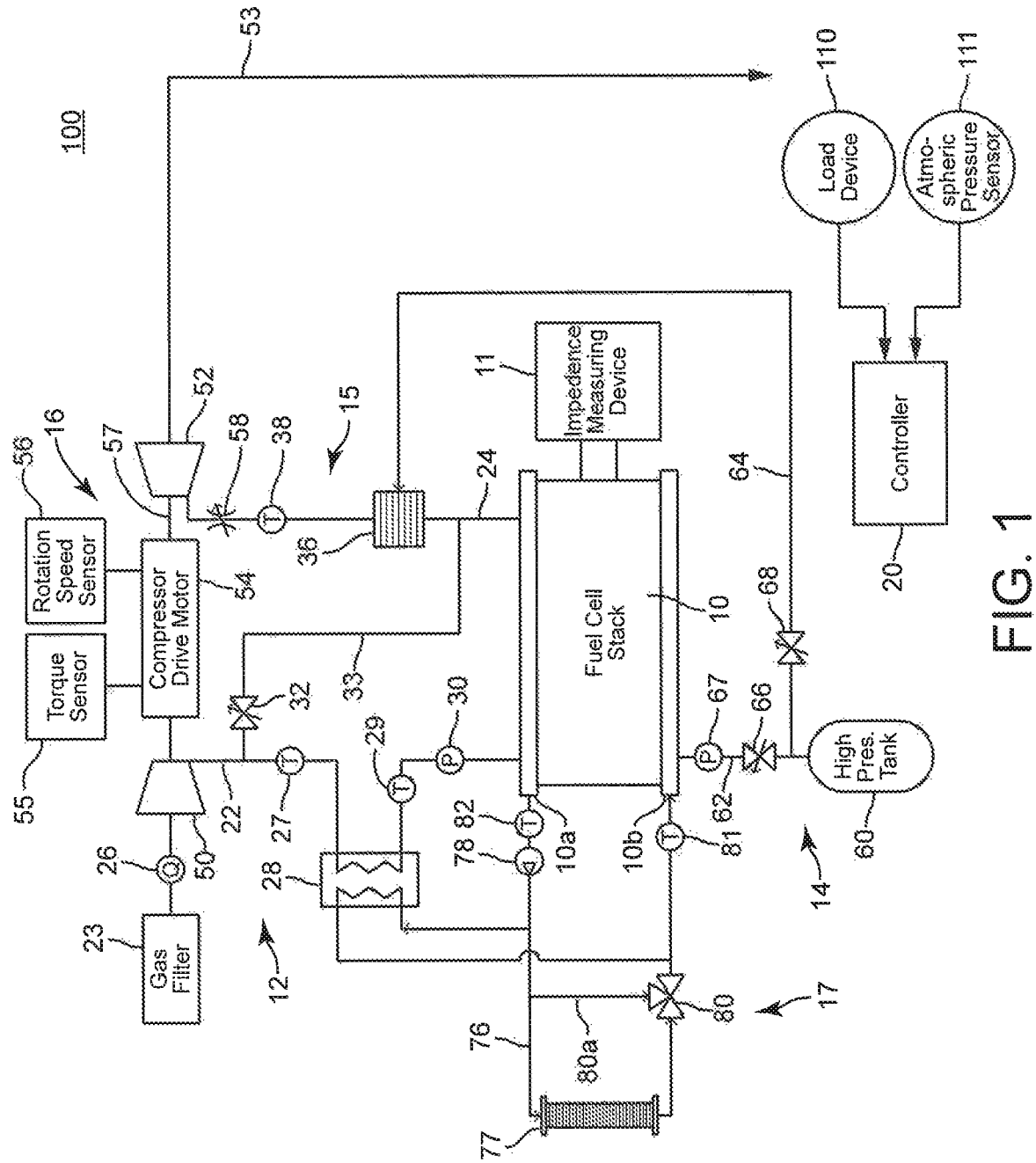
FIG. 1 is a schematic configuration diagram of a fuel cell system according to a first embodiment of the present invention.

Hereinafter, embodiments of the present invention will be described with reference to the drawings and so on.

First Embodiment

A fuel cell system 100 in a first embodiment of the present invention includes a fuel cell stack 10, a cathode supply/discharge mechanism 12, an anode supply mechanism 14, a heat supply mechanism 15, a compressor power supply mechanism 16 as a power recovery mechanism including a compressor 50 and a turbine 52, a stack cooling mechanism 17, and a controller 20.

The fuel cell stack 10 is a stacked battery in which a plurality of fuel cells are stacked together. The fuel cell stack 10 is supplied with an anode gas (hydrogen) from the anode supply mechanism 14 and a cathode gas (air) from the cathode supply/discharge mechanism 12 and generates electric power necessary for traveling of a vehicle. The generated electric power is used in various accessories such as the compressor 50 for use in operating the fuel cell system 100, and in a wheel drive motor not shown. An impedance measuring device 11 for measuring the impedance that is correlated with a wet/dry state of an electrolyte membrane formed in the fuel cell stack 10 is connected to a positive electrode terminal and a negative electrode terminal of the fuel cell stack 10.

The impedance measuring device 11 supplies an alternating current to the positive electrode terminal of the fuel cell stack 10 and detects an AC component of the voltage generated across the positive electrode terminal and the negative electrode terminal of the fuel cell stack 10. Then, based on the supplied alternating current and the detected AC component of the voltage, the impedance measuring device 11 calculates an AC resistance, i.e. an HFR (High Frequency Resistance), of the fuel cell stack 10. The impedance measuring device 11 inputs the calculated HFR into the controller 20 as an HFR measurement value. The impedance measuring device 11 may measure the output voltage, the output current, or the like of the fuel cell stack 10.

The cathode supply/discharge mechanism 12 includes a cathode gas supply passage 22 and a cathode discharged gas passage 24.

The cathode gas supply passage 22 is a passage in which air to be supplied to the fuel cell stack 10 flows. The cathode gas supply passage 22 has one end connected to a gas filter 23 and the other end connected to the fuel cell stack 10.

In the cathode gas supply passage 22, an air flow sensor 26, a compressor discharge temperature sensor 27, an aftercooler 28, a stack supply air temperature sensor 29, and an air pressure sensor 30 are disposed in this order from the upstream side.

In the cathode gas supply passage 22, the air flow sensor 26 is disposed at the air inlet of the compressor 50 of the compressor power supply mechanism 16. The air flow sensor 26 detects a flow rate of air to be sucked into the compressor 50 (hereinafter also referred to as a "compressor flow rate"). Hereinafter, this detection value of the air flow sensor 26 will also be referred to as a "compressor flow rate detection value". The compressor flow rate detection value detected by the air flow sensor 26 is input into the controller 20.

The compressor discharge temperature sensor 27 detects a temperature of air discharged from the compressor 50 and flowing upstream of the aftercooler 28 (hereinafter also referred to as a "compressor discharge temperature").

In the cathode gas supply passage 22, a bypass passage 33 having a bypass valve 32 therein is connected between the air flow sensor 26 and the compressor discharge temperature sensor 27. The bypass passage 33 is a passage coupling the cathode gas supply passage 22 to the cathode discharged gas passage 24. That is, the bypass passage 33 is a passage that supplies a cathode gas from the upstream side of the aftercooler 28 to a later-described catalyst combustor 36 by bypassing the aftercooler 28 and the fuel cell stack 10.

The aftercooler 28 cools air discharged from the compressor 50 and to be delivered to the fuel cell stack 10. The aftercooler 28 is configured as a water-cooled heat exchanger and connected to the stack cooling mechanism 17. That is, heat exchange is performed by the aftercooler 28 between cooling water for use in cooling the fuel cell stack 10 and air to be supplied to the fuel cell stack 10.

The stack supply air temperature sensor 29 detects a temperature of a cathode gas cooled by the aftercooler 28 and to be supplied to the fuel cell stack 10 (hereinafter also referred to as a "stack supply air temperature").

The air pressure sensor 30 detects a pressure in the cathode gas supply passage 22, i.e. a pressure of air to be supplied to the fuel cell stack 10 (hereinafter also referred to as an "air pressure"). The air pressure detection value detected by the air pressure sensor 30 is input into the controller 20.

The bypass valve 32 is a pressure control valve for adjusting the flow rate of air that is supplied to the cathode discharged gas passage 24 by bypassing the fuel cell stack 10, and is controlled to open and close by the controller 20.

That is, the bypass valve 32 is a valve for adjusting the flow rate of air, being a portion of air supplied from the compressor 50, that is supplied to the cathode discharged gas passage 24 through the bypass passage 33 by bypassing the fuel cell stack 10.

In this embodiment, as described above, the bypass passage 33 communicates with the upstream side of the catalyst combustor 36 in the cathode discharged gas passage 24. Therefore, with the bypass passage 33, it is possible to supply air in the cathode gas supply passage 22 to the cathode discharged gas passage 24, thereby improving the oxygen concentration of a cathode discharged gas that is supplied to the catalyst combustor 36.

The cathode discharged gas passage 24 has one end connected to the cathode outlet of the fuel cell stack 10 and the other end connected to the turbine 52. The cathode discharged gas passage 24 is provided with the heat supply mechanism 15.

The heat supply mechanism 15 includes the catalyst combustor 36 and a turbine inlet temperature sensor 38. The catalyst combustor 36 and the turbine inlet temperature sensor 38 are disposed in the cathode discharged gas passage 24 in this order from the fuel cell stack 10 toward the turbine 52.

In the catalyst combustor 36, a mixed gas obtained by mixing an anode gas and a cathode gas using a mixer not shown is catalytically combusted by catalytic action using platinum or the like. The anode gas is supplied to the catalyst combustor 36 from the anode supply mechanism 14 through a combustion anode gas supply passage 64, while a cathode discharged gas from the fuel cell stack 10 and air from the bypass passage 33 are supplied to the catalyst combustor 36 through the cathode discharged gas passage 24. Therefore, the cathode gas supplied to the catalyst combustor 36 contains the air supplied through the bypass passage 33 and the cathode discharged gas discharged from the fuel cell stack 10.

In this embodiment, using the catalyst combustor 36 as a combustor, the production of nitrogen compounds (Nox) is suppressed compared to the case where a diffusion combustion type combustor or a lean premixed combustion type combustor is used. However, use may be made of a combustor other than the catalyst combustor, such as the diffusion combustion type combustor or the lean premixed combustion type combustor.

The turbine inlet temperature sensor 38 detects a temperature of a post-combustion gas remaining after the combustion by the catalyst combustor 36, i.e. a temperature of a post-combustion gas to be supplied to the turbine 52 of the compressor power supply mechanism 16 (hereinafter also referred to as a "turbine inlet temperature"). The turbine inlet temperature detection value detected by the turbine inlet temperature sensor 38 is input into the controller 20.

Next, the anode supply mechanism 14 will be described. The anode supply mechanism 14 in this embodiment includes a high-pressure tank 60, a stack anode gas supply passage 62, and the combustion anode gas supply passage 64.

The high-pressure tank 60 is a gas storage vessel that stores hydrogen being an anode gas to be supplied to the fuel cell stack 10 while maintaining it in a high-pressure state.

The stack anode gas supply passage 62 is a passage for supplying hydrogen discharged from the high-pressure tank 60 to the fuel cell stack 10. The stack anode gas supply passage 62 has one end connected to the high-pressure tank 60 and the other end connected to the fuel cell stack 10.

The stack anode gas supply passage 62 is provided with an anode gas supply valve 66 and a hydrogen pressure detection sensor 67. The anode gas supply valve 66 is a pressure control valve that arbitrarily adjusts the supply amount of hydrogen to the fuel cell stack 10.

The hydrogen pressure detection sensor 67 detects a pressure of hydrogen to be supplied to the fuel cell stack 10 (hereinafter also referred to as a "hydrogen pressure"). The hydrogen pressure detection value detected by the hydrogen pressure detection sensor 67 is input into the controller 20.

On the other hand, the combustion anode gas supply passage 64 is a passage for supplying a portion of hydrogen discharged from the high-pressure tank 60 to the catalyst combustor 36. The combustion anode gas supply passage 64 has one end communicating with and branching from the stack anode gas supply passage 62 and the other end coupled to the catalyst combustor 36.

The combustion anode gas supply passage 64 is provided with a combustor hydrogen supply valve 68 that arbitrarily adjusts the supply amount of hydrogen to the catalyst combustor 36. The combustor hydrogen supply valve 68 is a pressure control valve whose opening degree is adjusted continuously or stepwise, thereby adjusting the supply amount of hydrogen to the catalyst combustor 36 as appropriate.

In the fuel cell system 100 according to this embodiment, an anode discharged gas from the fuel cell stack 10 can be treated by, for example, a circulating or non-circulating anode discharge mechanism not shown.

Next, the compressor power supply mechanism 16 will be described. The compressor power supply mechanism 16 includes the compressor 50, the turbine 52, and a compressor drive motor 54 as an electric motor.

The compressor 50 is connected to the compressor drive motor 54 and the turbine 52 via a rotary drive shaft 57. The compressor 50 is configured to be rotationally driven to suck the outside air and supply the cathode gas to the fuel cell stack 10 through the cathode gas supply passage 22. The compressor 50 can be driven by one or both of the power of the compressor drive motor 54 and the power of the turbine 52.

The turbine 52 is rotationally driven by a post-combustion gas supplied from the catalyst combustor 36. Then, the turbine 52 outputs this rotational driving power to the compressor 50 via the rotary drive shaft 57 and the compressor drive motor 54. That is, it is possible to drive the compressor 50 by the recovery power from the turbine 52. The post-combustion gas after it was used in driving the turbine 52 is discharged through a turbine exhaust passage 53.

When the power demand of the compressor 50 is relatively large so that it is necessary to increase the recovery power by the turbine 52, it is possible to appropriately supply the power to the compressor 50 by increasing a supply flow rate of a post-combustion gas that flows into the turbine 52 (hereinafter also referred to as a "turbine gas inflow flow rate"), a temperature thereof (hereinafter a "turbine inlet temperature"), and a pressure thereof.

The recovery power by the turbine 52 may be used not only for the rotational driving power of the compressor 50, but also in another arbitrary power demand mechanism in the fuel cell system 100.

Further, in this embodiment, the turbine 52 is provided with nozzle vanes 58 for adjusting the pressure of a post-combustion gas that is supplied to the turbine 52.

Figure 2A:
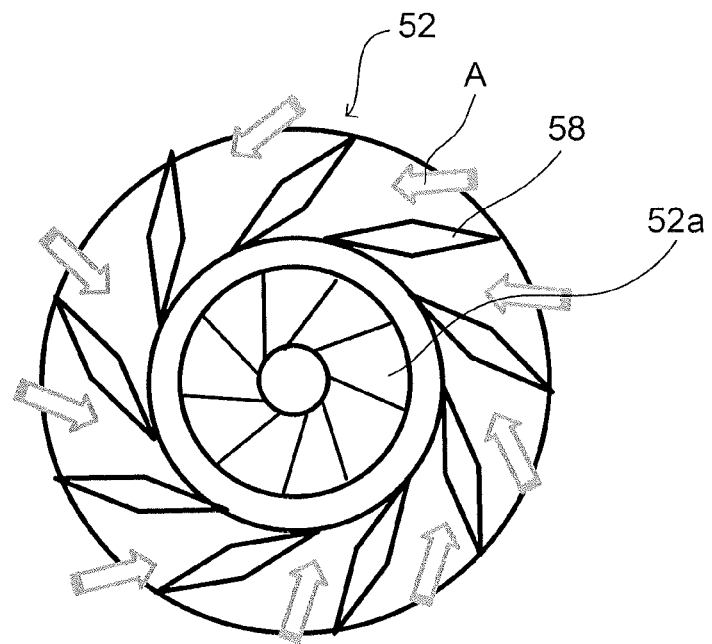
FIG. 2A is a diagram for explaining a state in which nozzle vanes are closed.
Figure 2B:
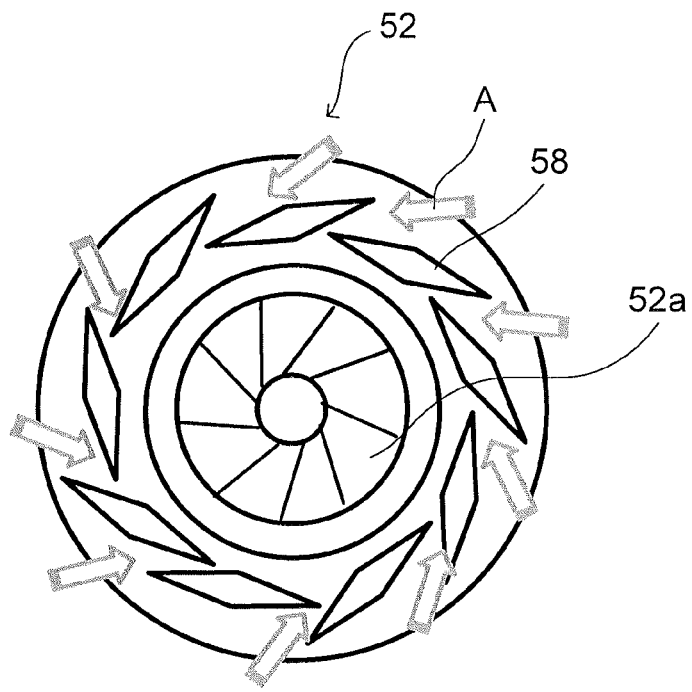
FIG. 2B is a diagram for explaining a state in which the nozzle vanes are opened.

FIGS. 2A and 2B are diagrams showing schematic structures of the nozzle vanes 58 provided to the turbine 52. In particular, FIG. 2A shows a state in which the nozzle vanes 58 are opened, and FIG. 2B shows a state in which the nozzle vanes 58 are closed. In FIGS. 2A and 2B, the flow directions of a post-combustion gas flowing in are exemplarily indicated by arrows A.

As shown in FIG. 2A, in the state where the nozzle vanes 58 are opened, the cross-sectional area of the inlet flow path from the nozzle vanes 58 to a turbine wheel 52a increases. Therefore, in this state, the pressure loss of the post-combustion gas that flows into the turbine 52 from the cathode discharged gas passage 24 becomes relatively small.

On the other hand, as shown in FIG. 2B, in the state where the nozzle vanes 58 are closed, the cross-sectional area of the inlet flow path to the turbine wheel 52a relatively decreases so that the pressure loss becomes large.

Referring back to FIG. 1, the compressor drive motor 54 is connected to the compressor 50 on one side of the rotary drive shaft 57 and connected to the turbine 52 on the other side of the rotary drive shaft 57. The compressor drive motor 54 has a function as an electric motor that is rotationally driven by being supplied with electric power from a battery not shown, the fuel cell stack 10, the turbine 52, and so on (power running mode), and a function as a power generator that generates electric power by being rotationally driven by external force and supplies the electric power to the battery and the fuel cell stack 10 (regeneration mode). The compressor drive motor 54 includes a motor case not shown, a stator fixed to an inner peripheral surface of the motor case, a rotor rotatably disposed inside the stator, and the rotary drive shaft 57 provided to the rotor.

The compressor drive motor 54 is provided with a torque sensor 55 and a rotation speed sensor 56. The torque sensor 55 detects torque of the compressor drive motor 54. The torque detection value of the compressor drive motor 54 detected by the torque sensor 55 is input into the controller 20.

Further, the rotation speed sensor 56 detects a rotation speed of the compressor drive motor 54. The compressor rotation speed detection value detected by the rotation speed sensor 56 is input into the controller 20.

Next, the stack cooling mechanism 17 will be described. The stack cooling mechanism 17 includes a cooling water circulation flow path 76 and a radiator 77 that performs heat exchange between cooling water flowing in the cooling water circulation flow path 76 and the outside air or the like, thereby cooling the cooling water.

The cooling water circulation flow path 76 is configured as an annular circulation path including a cooling water passage, not shown, of the fuel cell stack 10. The cooling water circulation flow path 76 is provided with a cooling water circulation pump 78 so that the cooling water can be circulated.

The cooling water circulating in the cooling water circulation flow path 76 is supplied into the fuel cell stack 10 from a cooling water inlet 10a of the fuel cell stack 10 and flows in the direction where the cooling water is discharged from a cooling water outlet 10b of the fuel cell stack 10.

Further, the cooling water circulation flow path 76 is provided with a radiator bypass three-way valve 80 at a position upstream of the radiator 77. The radiator bypass three-way valve 80 adjusts the amount of the cooling water that is supplied to the radiator 77. For example, when the temperature of the cooling water is relatively high, the radiator bypass three-way valve 80 is opened to circulate the cooling water through the radiator 77. On the other hand, when the temperature of the cooling water is relatively high, the radiator bypass three-way valve 80 is closed so that the cooling water flows into a bypass passage 80a to bypass the radiator 77.

Further, the cooling water circulation flow path 76 is provided with an inlet water temperature sensor 81 near the cooling water inlet 10a of the fuel cell stack 10 and with an outlet water temperature sensor 82 near the cooling water outlet 10b of the fuel cell stack 10.

The inlet water temperature sensor 81 detects a temperature of the cooling water that flows into the fuel cell stack 10. The outlet water temperature sensor 82 detects a temperature of the cooling water that is discharged from the fuel cell stack 10. The stack inlet water temperature detection value detected by the inlet water temperature sensor 81 and the stack outlet water temperature detection value detected by the outlet water temperature sensor 82 are input into the controller 20.

Further, as described above, the aftercooler 28 is connected to the cooling water circulation flow path 76. Consequently, as described above, it is possible to perform heat exchange between the cooling water in the cooling water circulation flow path 76 and the air in the cathode gas supply passage 22 to be supplied to the fuel cell stack 10. Therefore, for example, when the calorific value is required, such as, during warm-up of the fuel cell stack 10, the cooling water in the cooling water circulation flow path 76 can be heated by the heat of the high-temperature air discharged from the compressor 50, so that the calorific value requirement can be satisfied. On the other hand, since the aftercooler 28 cools the high-temperature air discharged from the compressor 50, the air reaches a temperature suitable for the operation of the fuel cell stack 10 and then is supplied to the fuel cell stack 10. The heat exchanged in the aftercooler 28 is transferred to the radiator 77 via the cooling water and dissipated to the outside of the system.

Further, the fuel cell system 100 configured as described above includes the controller 20 that comprehensively controls the system.

The controller 20 is formed by a microcomputer including a central processing unit (CPU), a read-only memory (ROM), a random access memory (RAM), and an input/output interface (I/O interface).

In addition to signals from the various sensors of the fuel cell system 100, signals from various sensors for detecting operating states of the fuel cell system 100, such as an atmospheric pressure sensor 111 for detecting the pressure of the atmosphere, are input into the controller 20.

Further, an output request signal indicative of an output electric power that is required for the fuel cell system 100 according to a load of a load device 110 (hereinafter also referred to simply as a "required output") is input into the controller 20. The load device 110 is formed by, for example, a wheel drive motor, a secondary battery, or the like. In this embodiment, for example, as a detection signal indicative of a depression amount of an accelerator pedal detected by an accelerator pedal sensor not shown becomes greater, the required electric power of the load device 110 increases, and therefore, the signal level of an output request signal that is input into the controller 20 becomes higher.

Using these input signals and so on, the controller 20 performs drive control of the compressor drive motor 54, the nozzle vanes 58, the cooling water circulation pump 78, the various valves 32, 66, 68, 80 including the bypass valve 32, and so on. For example, based on a power generation request signal of the load device 110, the controller 20 calculates target values of the compressor flow rate and the air pressure and a target value of the hydrogen supply pressure to the fuel cell stack 10 and, according to the calculation results, the controller 20 controls the torque (power) of the compressor drive motor 54, the opening degree of the nozzle vanes 58, and the opening degree of the anode gas supply valve 66.

In this embodiment, the controller 20 also acquires, as part of the above-described required output, information relating to electric power consumption of the compressor drive motor 54.

Next, various controls in the fuel cell system 100 in this embodiment will be described in detail with reference to block diagrams shown in FIGS. 3 to 7. Functions of blocks shown in FIGS. 3 to 7 are realized by the controller 20.

Figure 3:
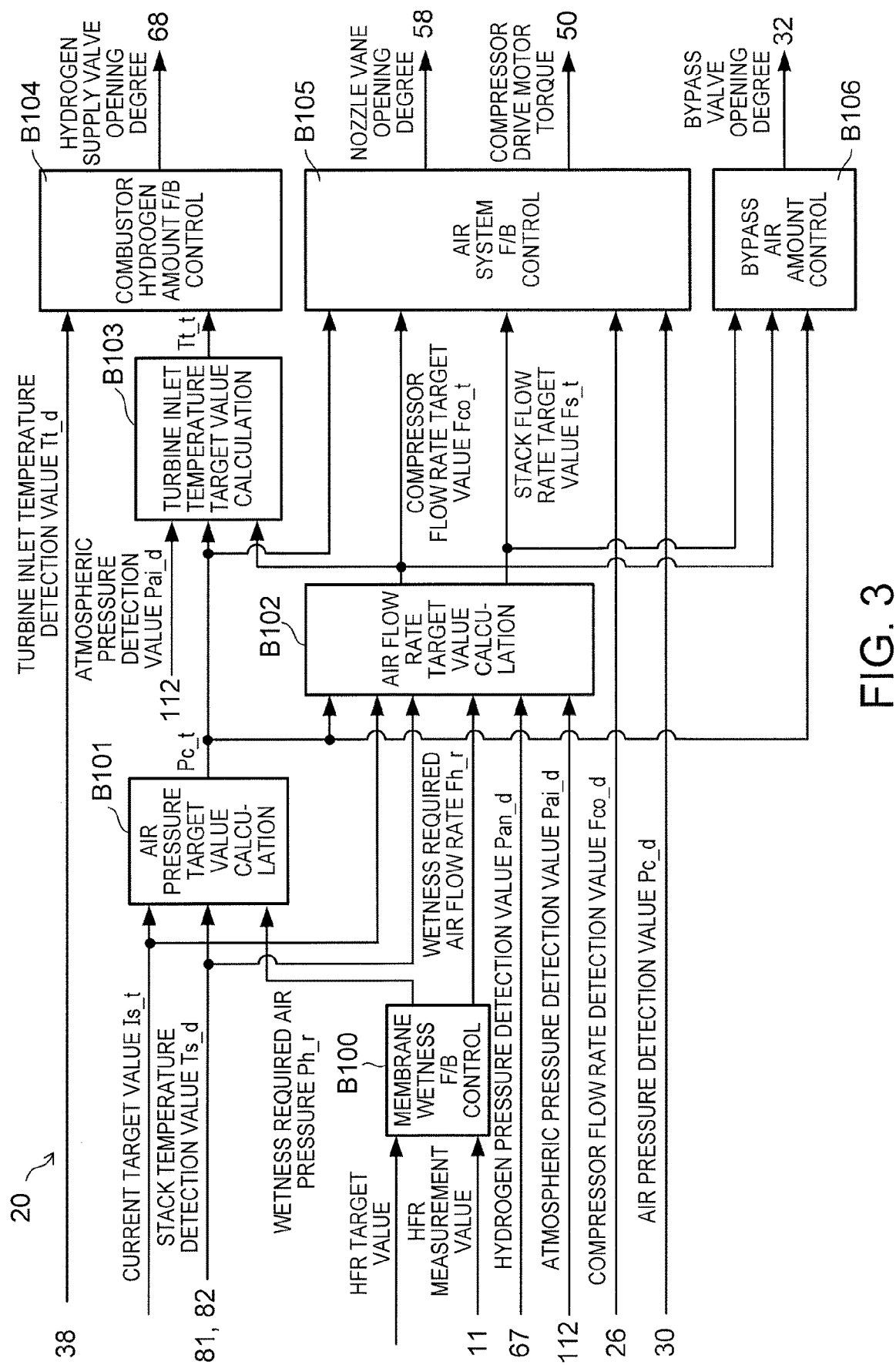
FIG. 3 is a block diagram showing a functional configuration example of a controller that controls the fuel cell system according to the first embodiment.

FIG. 3 is a control block diagram for explaining feedback (F/B) control of the opening degree of the combustor hydrogen supply valve 68, the opening degree of the nozzle vanes 58, the torque of the compressor drive motor 54, and the opening degree of the bypass valve 32 according to this embodiment.

The control blocks shown in FIG. 3 include a membrane wetness F/B control block B100, an air pressure target value calculation block B101, an air flow rate target value calculation block B102, a turbine inlet temperature target value calculation block B103, a combustor hydrogen amount F/B control block B104, an air system F/B control block B105, and a bypass air amount control block B106.

The membrane wetness F/B control block B100 controls an HFR value that is correlated with a wet/dry state of the electrolyte membrane formed in the fuel cell stack 10, so as to properly maintain the wet/dry state thereof.

In this embodiment, an HFR target value and an HFR measurement value are input into the membrane wetness F/B control block B100. The HFR target value is determined in advance using a map or the like that defines the relationship between the electric power to be generated by the fuel cell stack 10 and the HFR target value of the fuel cell stack 10. The HFR measurement value is measured using the impedance measuring device 11 provided to the fuel cell stack 10.

The membrane wetness F/B control block B100 calculates an air pressure (hereinafter also referred to as a "wetness required air pressure Ph_r") and an air flow rate (hereinafter also referred to as a "wetness required air flow rate Fh_r") that are required in terms of adjusting the operating state of the fuel cell system 100 so that the HFR measurement value approaches the HFR target value. That is, the membrane wetness F/B control block B100 calculates the wetness required air pressure Ph_r and the wetness required air flow rate Fh_r based on the HFR target value.

Further, the membrane wetness F/B control block B100 outputs the wetness required air pressure Ph_r to the air pressure target value calculation block B101 and outputs the wetness required air flow rate Fh_r to the air flow rate target value calculation block B102.

Based on a current target value Is_t, the air pressure target value calculation block B101 calculates an air pressure target value Pc_t being a target value of air pressure to be supplied to the fuel cell stack 10. The current target value Is_t is determined based on the system required output and the recovery power by the turbine 52 and is a target value of current to be taken out from the fuel cell stack 10.

In this embodiment, the current target value Is_t, a stack temperature detection value Ts_d, and the wetness required air pressure Ph_r calculated by the membrane wetness F/B control block B100 are input into the air pressure target value calculation block B101. The stack temperature detection value Ts_d is, for example, a value that is obtained by averaging detection values detected by the inlet water temperature sensor 81 and the outlet water temperature sensor 82. Either one of the detection values may alternatively be used. The air pressure target value calculation block B101 calculates an air pressure target value $Pc\_t$ being a target value of air pressure to be supplied to the fuel cell stack 10 based on the current target value $Is\_t$, the stack temperature detection value $Ts\_d$, and the wetness required air pressure $Ph\_r$ and outputs the air pressure target value $Pc\_t$ to the air flow rate target value calculation block B102 and the turbine inlet temperature target value calculation block B103.

Figure 4:
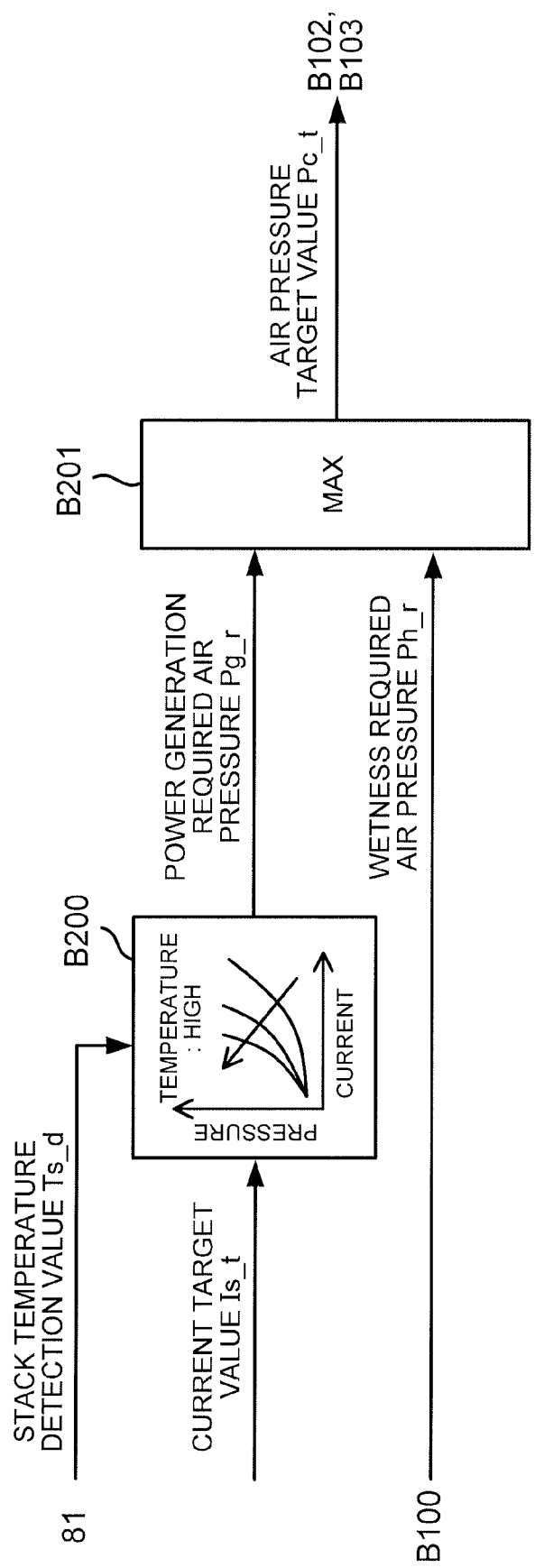
FIG. 4 is a block diagram showing a functional configuration example that calculates a target value of air pressure to be supplied to a fuel cell.

FIG. 4 is a block diagram showing details of a method for calculating the air pressure target value $Pc\_t$ that is performed by the air pressure target value calculation block B101. Blocks shown in this figure include a power generation required air pressure calculation block B200 and a MAX select block B201.

The current target value $Is\_t$ and the stack temperature detection value $Ts\_d$ are input into the power generation required air pressure calculation block B200. Then, from the current target value $Is\_t$ and the stack temperature detection value $Ts\_d$, the power generation required air pressure calculation block B200 calculates, based on a prestored map, a power generation required air pressure $Pg\_r$ being an air pressure that is necessary for power generation of the fuel cell stack 10. Further, the power generation required air pressure calculation block B200 outputs the power generation required air pressure $Pg\_r$ to the MAX select block B201. As is understood from the map of the power generation required air pressure calculation block B200 shown in the figure, the greater the current target value $Is\_t$, the greater the power generation required air pressure $Pg\_r$, and the higher the stack temperature detection value $Ts\_d$, the greater the power generation required air pressure $Pg\_r$.

The power generation required air pressure $Pg\_r$ calculated by the power generation required air pressure calculation block B200 and the wetness required air pressure $Ph\_r$ calculated by the membrane wetness F/B control block B100 are input into the MAX select block B201. The MAX select block B201 outputs as the air pressure target value $Pc\_t$ the greater value of the power generation required air pressure $Pg\_r$ and the wetness required air pressure $Ph\_r$ to the air flow rate target value calculation block B102 and the turbine inlet temperature target value calculation block B103.

Therefore, taking into account the air pressure (power generation required air pressure $Pg\_r$) that is required for controlling the power generation state of the fuel cell stack 10 and the air pressure (wetness required air pressure $Ph\_r$) that is required for controlling the wet/dry state of the electrolyte membrane, the maximum value is set as the air pressure target value $Pc\_t$ by the blocks shown in FIG. 4.

Referring back to FIG. 3, the air flow rate target value calculation block B102 calculates a compressor flow rate target value $Fco\_t$ and a stack flow rate target value $Fs\_t$. The stack flow rate target value $Fs\_t$ corresponds to a stack flow rate that is necessary for electrode reaction in the cathode electrode of the fuel cell stack 10 when the fuel cell stack 10 generates a target electric power. That is, the stack flow rate target value $Fs\_t$ corresponds to a stack flow rate that is necessary for having the output current be the current target value $Is\_t$ when generating the target electric power.

In this embodiment, the air pressure target value $Pc\_t$ calculated by the air pressure target value calculation block B101, the current target value $Is\_t$, the stack temperature detection value $Ts\_d$, the wetness required air flow rate $Fh\_r$, a hydrogen pressure detection value $Pan\_d$, and an atmospheric pressure detection value $Pai\_d$ are input into the air flow rate target value calculation block B102. Based on the air pressure target value $Pc\_t$, the current target value $Is\_t$, the stack temperature detection value $Ts\_d$, the wetness required air flow rate $Fh\_r$, the hydrogen pressure detection value $Pan\_d$, and the atmospheric pressure detection value $Pai\_d$, the air flow rate target value calculation block B102 calculates the compressor flow rate target value $Fco\_t$ and the stack flow rate target value $Fs\_t$.

Figure 5:
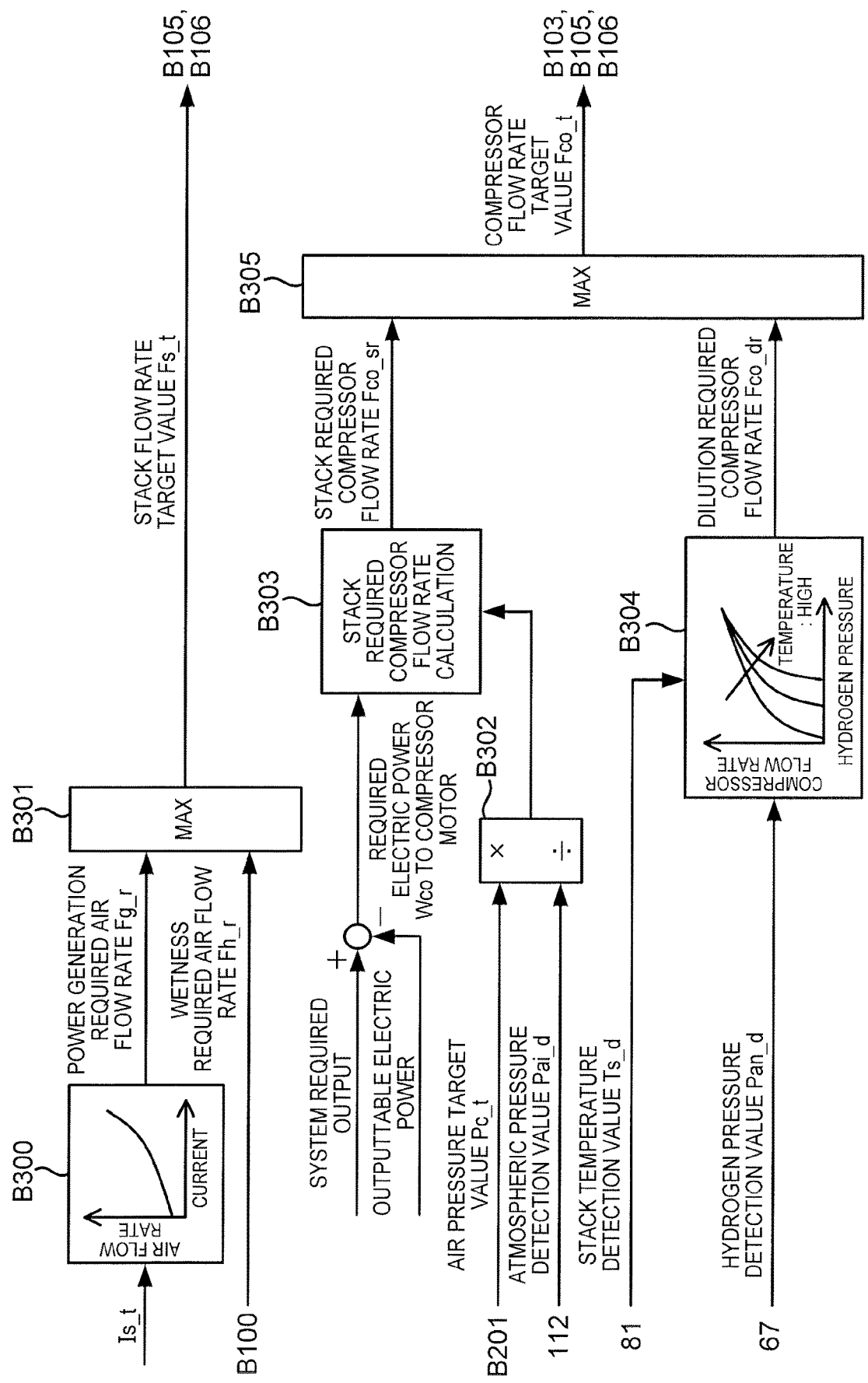
FIG. 5 is a block diagram showing a functional configuration example that calculates a target value of air flow rate to be supplied to the fuel cell and a target value of air flow rate to be discharged from a compressor.

FIG. 5 is a block diagram showing details of a method for calculating the stack flow rate target value $Fs\_t$ and the compressor flow rate target value $Fco\_t$ that is performed by the air flow rate target value calculation block B102. Blocks shown in this figure include a power generation required air flow rate calculation block B300, a MAX select block B301, a pressure ratio target value calculation block B302, a stack required compressor flow rate calculation block B303, a dilution required flow rate calculation block B304, and a MAX select block B305.

The current target value $Is\_t$ is input into the power generation required air flow rate calculation block B300. From the current target value $Is\_t$, the power generation required air flow rate calculation block B300 calculates, based on a prestored map, a power generation required air flow rate $Fg\_r$ being an air flow rate that is necessary for power generation in the fuel cell stack 10.

As shown in the figure, in the map of the power generation required air flow rate calculation block B300, the greater the current target value $Is\_t$, the greater the power generation required stack flow rate $Fs\_gr$. Further, the power generation required air flow rate calculation block B300 outputs the power generation required air flow rate $Fg\_r$ to the MAX select block B301.

The power generation required air flow rate $Fg\_r$ calculated by the power generation required air flow rate calculation block B300 and the wetness required air flow rate $Fh\_r$ are input into the MAX select block B301. Then, the MAX select block B301 outputs the greater value of the power generation required air flow rate $Fg\_r$ and the wetness required air flow rate $Fh\_r$ as the stack flow rate target value $Fs\_t$. Consequently, the stack flow rate target value $Fs\_t$ is set by taking into account both the air flow rate based on the power generation requirement and the air flow rate based on the wetness requirement.

The air pressure target value $Pc\_t$ and the atmospheric pressure detection value $Pai\_d$ are input into the pressure ratio target value calculation block B302. Then, the pressure ratio target value calculation block B302 divides the air pressure target value $Pc\_t$ by the atmospheric pressure detection value $Pai\_d$ to obtain a pressure ratio target value $Pc\_t/Pai\_d$ and outputs it to the stack required compressor flow rate calculation block B303.

A required electric power $Wco$ to compressor motor and the pressure ratio target value $Pc\_t/Pai\_d$ are input into the stack required compressor flow rate calculation block B303. Herein, the required electric power $Wco$ to compressor motor is defined as a value that is obtained by subtracting an outputtable electric power of the fuel cell stack 10 (hereinafter also referred to simply as an "outputtable electric power") from the required output. The outputtable electric power of the fuel cell stack 10 is determined according to the size of the fuel cell stack 10, the traveling state of the vehicle equipped with the fuel cell stack 10, and so on.

That is, when the required output is greater than the outputtable electric power, the required electric power $Wco$ to compressor motor takes a positive value. When the required electric power $Wco$ to compressor motor takes the positive value in this way, it means that generated electric power of the fuel cell stack 10 is insufficient for the required output. Therefore, in this embodiment, in this case, the shortage of electric power is compensated by regenerated electric power of the compressor drive motor 54 based on recovery power of the turbine 52.

On the other hand, when the required output is less than the outputtable electric power, the required electric power Wco to compressor motor takes a negative value. This means that generated electric power of the fuel cell stack 10 is sufficient for the required output so that the compressor drive motor 54 is operated in the power running mode.

Further, the greater the required electric power Wco to compressor motor, the greater the pressure ratio target value Pc_t/Pai_d is set. That is, since the increase/decrease of the pressure ratio target value Pc_t/Pai_d is linked to the increase/decrease of the required electric power Wco to compressor motor, the magnitude of the required electric power Wco to compressor motor can be detected by monitoring the magnitude of the pressure ratio target value Pc_t/Pai_d.

Then, the stack required compressor flow rate calculation block B303 calculates a stack required compressor flow rate Fco_sr using a predetermined map based on the input required electric power Wco to compressor motor and the input pressure ratio target value Pc_t/Pai_d. Herein, the stack required compressor flow rate Fco_sr is a candidate value of compressor flow rate that is determined based on the magnitude between the required output and the outputtable electric power, i.e. according to whether or not the generated electric power of the fuel cell stack 10 is insufficient or not.

Figure 6:
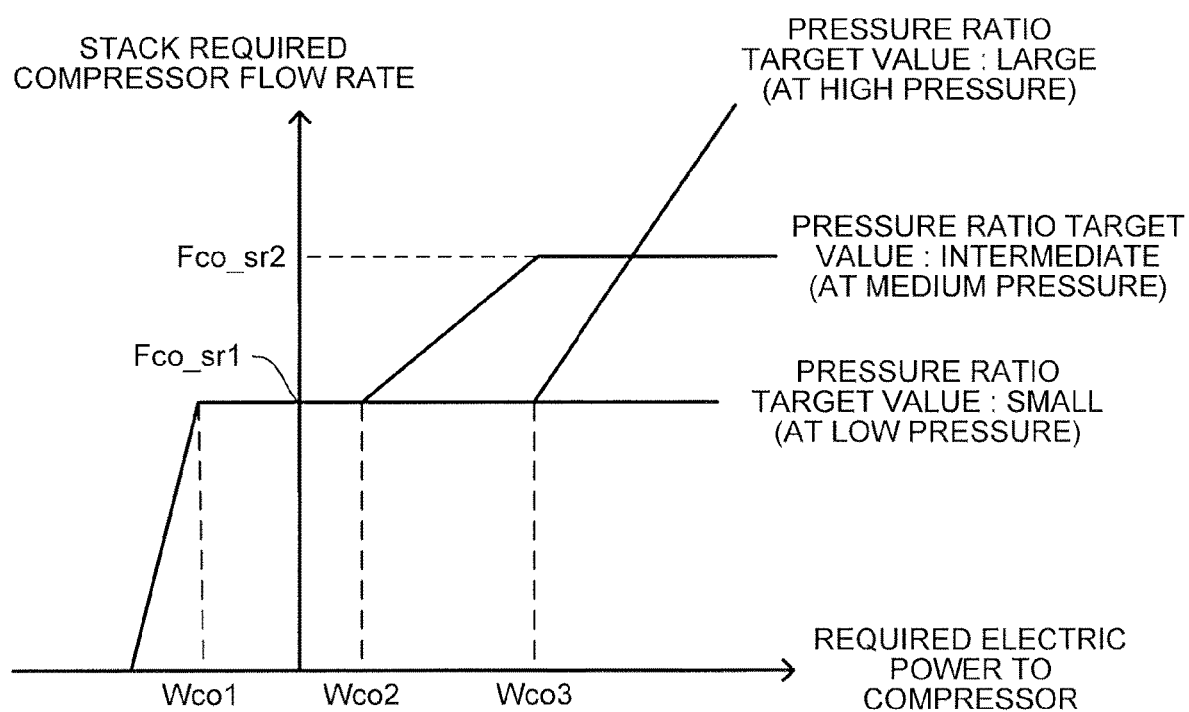
FIG. 6 is a map showing the relationship between the required electric power to compressor motor and the stack required compressor flow rate according to the pressure ratio target value.

FIG. 6 is a map showing the relationship between the required electric power Wco to compressor motor and the stack required compressor flow rate according to the pressure ratio target value.

As shown in the figure, when the required electric power Wco to compressor motor takes a negative value (when the generated electric power of the fuel cell stack 10 is not insufficient), the stack required compressor flow rate Fco_sr is increased to a predetermined value Fco_sr1 until the required electric power Wco to compressor motor reaches a predetermined value Wco1 regardless of the value of the pressure ratio target value Pc_t/Pai_d. The predetermined value Fco_sr1 is a value corresponding to a stack flow rate that is determined according to a required electric power to be generated by the fuel cell stack 10. That is, in the state where the generated electric power is not insufficient as described above, the compressor drive motor 54 is operated in the power running mode so that it is not necessary to set a compressor flow rate that is greater than the flow rate based on the required electric power to be generated by the fuel cell stack 10, and therefore, the compressor flow rate corresponding to the stack flow rate that is determined according to the required electric power to be generated by the fuel cell stack 10 is set.

On the other hand, when the required electric power Wco to compressor motor takes a positive value (when the generated electric power of the fuel cell stack 10 is insufficient), the stack required compressor flow rate Fco_sr is set according to the pressure ratio target value Pc_t/Pai_d.

First, when the pressure ratio target value Pc_t/Pai_d is set to the smallest value (at low pressure), the stack required compressor flow rate Fco_sr is set to the predetermined value Fco_sr1 without increasing the stack required compressor flow rate Fco_sr regardless of the magnitude of the required electric power Wco to compressor motor. The reason for preventing the stack required compressor flow rate Fco_sr from increasing beyond the predetermined value Fco_sr1 at low pressure as described above is that since the pressure loss of the cathode system becomes large at low pressure so that the recovery power by the turbine 52 becomes low, even if the compressor flow rate is increased to increase the turbine gas inflow flow rate, a large improvement in the recovery power by the turbine 52 is not expected.

Next, when the pressure ratio target value Pc_t/Pai_d is set to an intermediate value (at medium pressure) that is greater than that at low pressure, after the required electric power Wco to compressor motor has reached a predetermined value Wco2, the stack required compressor flow rate Fco_sr is increased to a predetermined value Fco_sr2 from the predetermined value Fco_sr1 that is based on the required electric power to be generated by the fuel cell stack 10.

The reason for increasing, at medium pressure, the stack required compressor flow rate Fco_sr beyond the predetermined value Fco_sr1 that is based on the required electric power to be generated by the fuel cell stack 10 as described above is to increase the turbine gas inflow flow rate so as to obtain regenerated electric power from the compressor drive motor 54, thereby eliminating the shortage of generated electric power. However, since the pressure loss of the cathode system is still large at medium pressure, an increase in the recovery power above a certain level is not expected even by largely increasing the turbine gas inflow flow rate, and therefore, in order to increase the compressor flow rate to the extent where it is possible to increase the recovery power by the turbine 52, the stack required compressor flow rate Fco_sr is increased to the predetermined value Fco_sr2. In this embodiment, as will be described later, with the increase of the stack required compressor flow rate Fco_sr, the opening degree of the bypass valve 32 is increased to prevent a cathode gas at a flow rate equal to or greater than that required by the fuel cell stack 10 from flowing to the aftercooler 28. This point will be described later in detail.

Further, when the pressure ratio target value Pc_t/Pai_d is set to the greatest value (at high pressure), after the required electric power Wco to compressor motor has reached a predetermined value Wco3, the stack required compressor flow rate Fco_sr is increased from the predetermined value Fco_sr1.

In this way, also at high pressure, the stack required compressor flow rate Fco_sr is increased beyond the predetermined value Fco_sr1 that is based on the required electric power to be generated by the fuel cell stack 10 so as to obtain regenerated electric power from the compressor drive motor 54. At high pressure, since the pressure loss of the cathode system is small, the recovery power by the turbine 52 can be increased beyond the certain level by largely increasing the turbine gas inflow flow rate.

Herein, also at high pressure, with the increase of the stack required compressor flow rate Fco_sr, the opening degree of the bypass valve 32 is increased to prevent a cathode gas at a flow rate equal to or greater than that required by the fuel cell stack 10 from flowing to the aftercooler 28.

Referring back to FIG. 5, the stack required compressor flow rate calculation block B303 outputs the stack required compressor flow rate Fco_sr calculated by the stack required compressor flow rate calculation block B303 to the MAX select block B305.

On the other hand, the stack temperature detection value Ts_d and the hydrogen pressure detection value Pan_d detected by the hydrogen pressure detection sensor 67 are input into the dilution required flow rate calculation block B304. Then, the dilution required flow rate calculation block B304 calculates, using a predetermined map, a dilution required compressor flow rate Fco_dr being an air flow rate that is required for diluting an anode discharged gas discharged from the fuel cell stack 10, and outputs the dilution required compressor flow rate Fco_dr to the MAX select block B305.

In the map of the dilution required flow rate calculation block B304 shown in the figure, the greater the hydrogen pressure detection value Pan_d, the greater the dilution required compressor flow rate Fco_dr. Further, in the map, as the stack temperature detection value Ts_d increases, the dilution required compressor flow rate Fco_dr decreases. This is because, in the state where the stack temperature detection value Ts_d is high, the anode discharged gas temperature is high so that the pressure loss of an anode discharged gas discharge flow path increases resulting in a decrease in the flow rate, and therefore, it is necessary to perform correction to decrease the air amount for use in dilution correspondingly.

Then, the dilution required flow rate calculation block B304 outputs the dilution required compressor flow rate Fco_dr to the MAX select block B305.

The stack required compressor flow rate Fco_sr output from the stack required compressor flow rate calculation block B303 and the dilution required compressor flow rate Fco_dr calculated by the dilution required flow rate calculation block B304 are input into the MAX select block B305. Then, the MAX select block B305 outputs as the compressor flow rate target value Fco_t the greater value of the stack required compressor flow rate Fco_sr and the dilution required compressor flow rate Fco_dr to the blocks B103, B105, B106.

That is, in this embodiment, the compressor flow rate target value Fco_t is determined by taking into account the required electric power to be generated by the fuel cell stack 10 and the anode discharged gas dilution requirement. In addition to these requirements, the compressor flow rate target value Fco_t may be determined by taking into account a surge avoidance requirement for avoiding surge of the compressor 50.

Referring back to FIG. 3, based on the flow rate and pressure of a cathode gas that is supplied to the fuel cell stack 10, the turbine inlet temperature target value calculation block B103 controls the temperature of a post-combustion gas that is discharged from the catalyst combustor 36 to the turbine 52, i.e. the turbine inlet temperature.

In this embodiment, the atmospheric pressure detection value Pai_d, the air pressure target value Pc_t calculated by the air pressure target value calculation block B101, and the compressor flow rate target value Fco_t calculated by the air flow rate target value calculation block B102 are input into the turbine inlet temperature target value calculation block B103. Based on the atmospheric pressure detection value Pai_d, the air pressure target value Pc_t, and the compressor flow rate target value Fco_t, the turbine inlet temperature target value calculation block B103 calculates a target value of inlet temperature of the turbine 52 to be reached by the turbine inlet temperature (hereinafter also referred to as a "turbine inlet temperature target value Tt_t").

Figure 7:
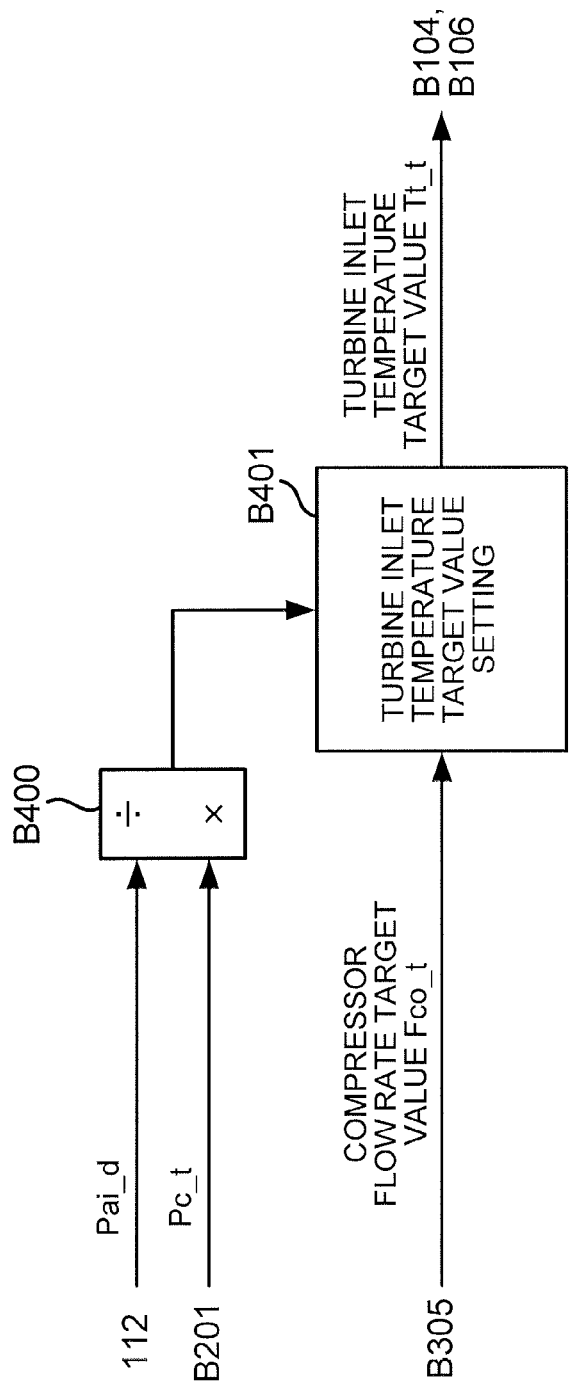
FIG. 7 is a block diagram showing a functional configuration example that calculates a target value of turbine inlet temperature.

FIG. 7 is a block diagram showing details of a method for calculating the turbine inlet temperature target value Tt_t that is performed by the turbine inlet temperature target value calculation block B103. Blocks shown in this figure include a pressure ratio target value calculation block B400 and a turbine inlet temperature target value setting block B401.

The air pressure target value Pc_t and the atmospheric pressure detection value Pai_d are input into the pressure ratio target value calculation block B400. Then, the pressure ratio target value calculation block B400 divides the air pressure target value Pc_t by the atmospheric pressure detection value Pai_d to obtain the pressure ratio target value Pc_t/Pai_d and outputs it to the turbine inlet temperature target value setting block B401.

The compressor flow rate target value Fco_t and the pressure ratio target value Pc_t/Pai_d calculated by the pressure ratio target value calculation block B400 are input into the turbine inlet temperature target value setting block B401. Then, from the compressor flow rate target value Fco_t and the pressure ratio target value Pc_t/Pai_d, the turbine inlet temperature target value setting block B401 calculates the turbine inlet temperature target value Tt_t based on a prestored map.

Figure 8:
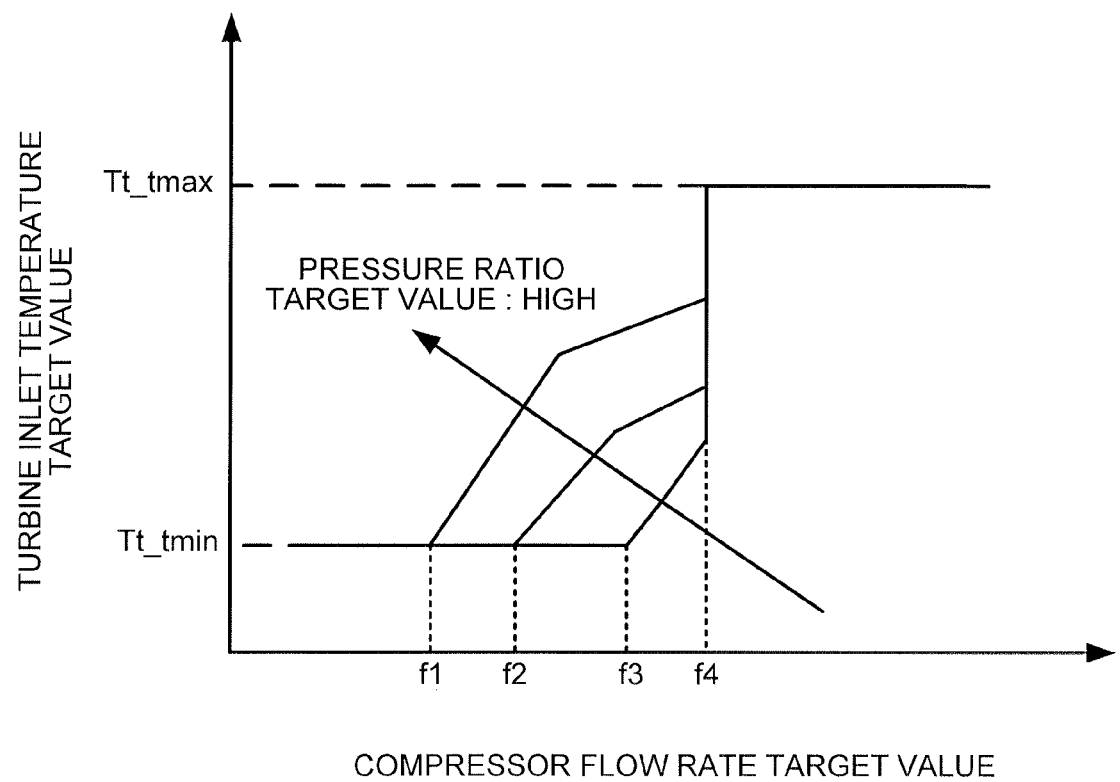
FIG. 8 is a diagram showing a map for determining a turbine inlet temperature target value.

FIG. 8 is a diagram showing a map for determining a turbine inlet temperature target value.

As shown in FIG. 8, the turbine inlet temperature target value Tt_t changes according to the pressure ratio target value Pc_t/Pai_d and the compressor flow rate target value Fco_t between a lower limit value Tt_tmin of turbine inlet temperature that is determined in advance, and an allowable upper limit temperature Tt_tmax of turbine inlet temperature that is determined by taking into account the heat-resistant temperatures of components.

Specifically, first, at high pressure where the pressure ratio target value Pc_t/Pai_d is set to the greatest value, at medium pressure where the pressure ratio target value Pc_t/Pai_d is set to the intermediate value, and at low pressure where the pressure ratio target value Pc_t/Pai_d is set to the smallest value, the turbine inlet temperature target values Tt_t are maintained at the lower limit value Tt_tmin until the compressor flow rate target values Fco_t respectively reach predetermined values f1, f2, f3 (f1<f2<f3), and are then increased.

The reason for starting to increase the turbine inlet temperature target value Tt_t at the smaller compressor flow rate target value Fco_t as the pressure becomes higher is that even when the compressor flow rate target value Fco_t is the same, the required electric power to be generated by the fuel cell stack 10 increases as the pressure increases, and therefore, it is necessary to increase the recovery power from the turbine 52 by raising the turbine inlet temperature.

In all the cases of high pressure, medium pressure, and low pressure, when the compressor flow rate target value Fco_t has reached a predetermined value f4 that is greater than the flow rates f1 to f3 where the turbine inlet temperature starts to be raised, the turbine inlet temperature target value Tt_t is set to the allowable upper limit temperature Tt_tmax. This is because when the compressor flow rate target value Fco_t is increased beyond a certain level, the required output is large so that the required electric power Wco to compressor motor is large, and therefore, the turbine inlet temperature is rapidly raised so as to increase the recovery power to be obtained by the turbine 52. On the other hand, in terms of the heat-resistant temperatures of components, the turbine inlet temperature is prevented from rising beyond the allowable upper limit temperature Tt_tmax.

Referring back to FIG. 3, a turbine inlet temperature detection value Tt_d and the turbine inlet temperature target value Tt_t calculated by the turbine inlet temperature target value calculation block B103 are input into the combustor hydrogen amount F/B control block B104. The combustor hydrogen amount F/B control block B104 performs feedback control of the opening degree of the combustor hydrogen supply valve 68 so that the turbine inlet temperature detection value Tt_d approaches the turbine inlet temperature target value Tt_t.

In this embodiment, as the required load to the fuel cell stack 10 or the required power from the turbine 52 increases, the opening degree of the combustor hydrogen supply valve 68 is set to be greater. Specifically, when at least one of the stack flow rate target value Fs_t and the compressor flow rate target value Fco_t is increased, since air supplied to the catalyst combustor 36 is increased, the opening degree of the combustor hydrogen supply valve 68 is increased to increase the hydrogen supply amount to the catalyst combustor 36 for combusting the air.

As detection values, a compressor flow rate detection value Fco_d and an air pressure detection value Pc_d are input into the air system F/B control block B105. Further, as target values, the air pressure target value Pc_t, the compressor flow rate target value Fco_t, and the stack flow rate target value Fs_t are input into the air system F/B control block B105.

Then, based on the input detection values and target values, the air system F/B control block B105 performs feedback control of the opening degree of the nozzle vanes 58 and the torque of the compressor drive motor 54. Specifically, the air system F/B control block B105 increases the opening degree of the nozzle vanes 58 when the required load to the fuel cell stack 10 is high or when the required power of the turbine 52 is high, i.e. when at least one of the stack flow rate target value Fs_t and the compressor flow rate target value Fco_t is increased.

Likewise, the torque (power) of the compressor drive motor 54 is controlled to be greater as at least one of the air pressure target value Pc_t, the stack flow rate target value Fs_t, and the compressor flow rate target value Fco_t increases.

The air pressure target value Pc_t, the compressor flow rate target value Fco_t, and the stack flow rate target value Fs_t are input into the bypass air amount control block B106. Then, based on these values, the bypass air amount control block B106 controls the opening degree of the bypass valve 32.

Specifically, the bypass air amount control block B106 controls the opening degree of the bypass valve 32 so that the flow rate of air flowing in the bypass passage 33 becomes the difference between the compressor flow rate target value Fco_t and the stack flow rate target value Fs_t.

Next, the energy balance of the compressor power supply mechanism 16 (see FIG. 1) in the fuel cell system 100 described above will be described in detail.

Hereinafter, first, the relationship between work that is used by the compressor 50 (hereinafter also referred to as "compressor work Wc") and work that can be recovered from the turbine 52 (hereinafter also referred to as "turbine work Wt") will be described.

First, a theoretical formula for calculating the compressor work Wc is given by $$Wc = Fco \times Cpc \times Tc \times [(Prc)^{0.286} - 1]/\eta c \quad (1)$$

where Fco represents a compressor flow rate, Cpc a specific heat of air supplied by the compressor 50, Tc a compressor discharge temperature, Prc a pressure ratio, and $\eta c$ a compressor efficiency. In this embodiment, fixed values determined in advance based on the nature of the compressor 50 are used as the specific heat Cpc of air supplied by the compressor 50 and the compressor efficiency $\eta c$. Therefore, the compressor work Wc mainly changes according to the compressor flow rate Fco, the compressor discharge temperature Tc, and the pressure ratio Prc. Consequently, based on the formula (1), the compressor work Wc increases when at least one of the compressor flow rate Fco, the compressor discharge temperature Tc, and the pressure ratio Prc increases.

A theoretical formula for calculating the turbine work Wt is given by $$Wt = Ft \times Cpt \times Tt \times [1 - (1/Prt)^{0.286}] \times \eta t \quad (2)$$

where Ft represents a flow rate of a post-combustion gas that flows into the turbine 52 (hereinafter also referred to as a "turbine inflow flow rate"), Cpt a specific heat of a post-combustion gas that flows into the turbine 52, Tt a turbine inlet temperature, Prt a turbine expansion ratio, and $\eta t$ a turbine efficiency. Herein, in this embodiment, the specific heat Cpt of a post-combustion gas that flows into the turbine 52 can be determined in advance by deeming components of the post-combustion gas to be almost the same as those of air, or the like. The turbine efficiency $\eta t$ can be determined in advance based on the nature of the turbine 52. Therefore, the turbine work Wt mainly changes according to the turbine inflow flow rate Ft, the turbine inlet temperature Tt, and the turbine expansion ratio Prt. Consequently, based on the formula (2), the turbine work Wt increases when at least one of the turbine inflow flow rate Ft and the turbine inlet temperature Tt increases.

Further, a theoretical formula for calculating a pressure loss $\Delta Ps$ of the fuel cell stack 10 is given by $$\Delta Ps(k \times Fs \times Prc \times Ts)/T0 \quad (3)$$

where k represents a pressure loss coefficient in a cathode flow path in the fuel cell stack 10, Fs a stack flow rate, Ts a stack temperature, and T0 a temperature in the standard state ($\approx 273.15K$). Prc in the formula (3) is calculated by the following formula using the turbine expansion ratio Prt described above.

$$Prt = Prc + (\Delta Ps/Patm) \quad (4)$$

Therefore, the pressure loss $\Delta Ps$ of the fuel cell stack 10 mainly increases when at least one of the stack flow rate Fs and the stack temperature Ts increases.

Further, assuming that the oxygen concentration in the atmosphere is 21% under operating conditions in which generation of water by an electrochemical reaction in the fuel cell stack 10 does not occur in the system, the relationship between the compressor flow rate Fco and the turbine inflow flow rate Ft is given by the following formula.

$$Ft = Fs \times [0.79 + 0.21 \times (1 + SRc)/SRc] + \frac{1}{2} \times FH \quad (5)$$

where SRc represents a stack excess air ratio and FH a hydrogen flow rate supplied to the catalyst combustor 36. The hydrogen supply flow rate FH can be calculated, for example, using a predetermined map based on the hydrogen pressure detection value Pan_d by the hydrogen pressure detection sensor 67, the opening degree of the combustor hydrogen supply valve 68, and so on.

The turbine inlet temperature Tt is calculated from the calorific value that is basically determined by the gas flow rate supplied to the catalyst combustor 36, its specific heat, and the hydrogen supply flow rate FH to the catalyst combustor 36. Further, the turbine inlet temperature Tt is adjusted so as not to exceed the allowable upper limit temperature Tt_tmax that is determined by taking into account the heat-resistant temperatures of components.

Further, work that is performed by the compressor drive motor 54 (hereinafter also referred to as "drive motor work Wm") is basically given by the following formula (6).

$$Wm = Wc - Wt \quad (6)$$

With respect to the drive motor work Wm, it is necessary to take into account the limitation due to the size of the compressor drive motor 54 and the limitation due to the required electric power to be generated by the fuel cell stack 10. Therefore, the drive motor work Wm is limited to the following limit value Wml.

$$Wml = \text{Min}(Wmlm, Wstmax - Wreq) \tag{7}$$

Herein, Min (a, b) represents the smaller value of a and b (when both are the same, either will do). In the formula (7), Wstmax is an outputtable electric power of the fuel cell stack 10. Wmlm is a limit value due to the size of the compressor drive motor 54.

As described above, the outputtable electric power Wstmax in the formula (7) is determined according to the factors such as the traveling state of the vehicle equipped with the fuel cell stack 10 and the stack size. Therefore, for example, when the temperature is limited in a hot district or the like, the outputtable electric power Wstmax decreases. On the other hand, Wreq is a required output. That is, Wstmax−Wreq in the formula (7) corresponds to the above-described required electric power Wco to compressor motor. Therefore, the work Wm of the compressor drive motor 54 is adjusted so as not to exceed the limit value Wml defined by the formula (7).

Herein, as is understood from the formula (6), since the compressor work Wc can be covered by the turbine work Wt, it is possible to reduce electric power to be supplied to the compressor drive motor 54 from the fuel cell stack 10 or the battery.

When the drive motor work Wm takes a negative value, i.e. when the compressor drive motor 54 is operated in the regeneration mode so that power is not supplied from the compressor drive motor 54 to the compressor 50, it is possible to ensure the compressor work Wc by the turbine work Wt. When the turbine work Wt is further increased, electric power obtained by regeneration of the compressor drive motor 54 is improved in addition to ensuring the power of the compressor 50, and therefore, this electric power can be used for covering the shortage of output electric power of the fuel cell stack 10 for the required output.

Next, changes of the state of the fuel cell system 100 according to the required output will be described.

Figure 9:
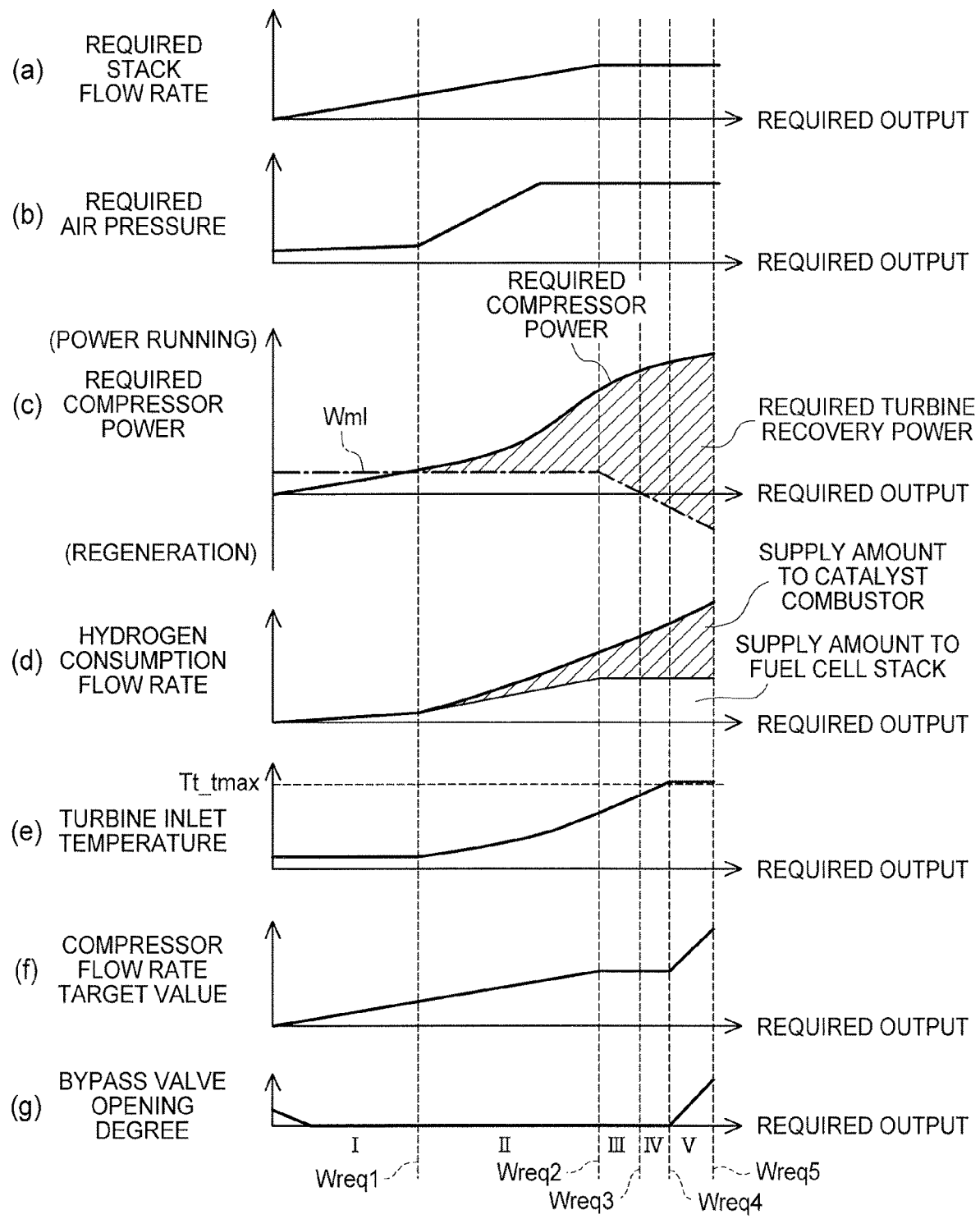
FIG. 9 is a time chart showing changes of the state of the fuel cell system according to the required output.

FIG. 9 is a time chart showing changes of the state of the fuel cell system 100 according to the required output. Specifically, FIG. 9(*a*) to FIG. 9(*g*) are time charts respectively showing changes of a required stack flow rate, a required air pressure, a power required by the compressor 50 (hereinafter also referred to as a "required compressor power"), a hydrogen fuel consumption amount, a turbine inlet temperature Tt, a compressor flow rate target value Fco_t, and a bypass valve opening degree according to the required output.

Hereinafter, changes of the system state will be described with respect to a range I where the required output is Wreq1 or less, a range II where the required output is Wreq1 to Wreq2, a range III where the required output is Wreq2 to Wreq3, a range IV where the required output is Wreq3 to Wreq4, and a range V where the required output is Wreq4 to Wreq5.

First, in the range I, the state is a low-load state where electric power is not insufficient for the required electric power to be generated by the fuel cell stack 10, and as shown in FIG. 9(*a*) and FIG. 9(*b*), the values of the required stack flow rate and the required air pressure are relatively small. As shown in FIG. 9(*c*), although the required compressor power is increased with an increase in the required output, the required compressor power has not yet reached the limit value Wml (indicated by a broken line in the figure) of the output of the compressor drive motor 54.

Therefore, in this case, since the compressor power can be covered by electric power from the fuel cell stack 10 or the battery without recovery power by the turbine 52, the compressor drive motor 54 is operated in the power running mode.

Further, in the range I, since it is not essential to ensure the recovery power of the turbine 52 as described above, the output of the turbine 52 can be made relatively small. Therefore, control to increase the hydrogen consumption amount, the turbine inlet temperature Tt, or the turbine inflow flow rate Ft is not performed. In this case, the bypass valve 32 is basically fully closed as shown in FIG. 9(*g*). In FIG. 9(*g*), the bypass valve 32 is set to a certain opening degree in a range where the required output is close to zero. At the extremely low load, the dilution required compressor flow rate Fco_dr that is calculated by B304 in FIG. 5 becomes large relative to the required stack flow rate, and therefore, this is intended to allow an excess cathode gas for the stack flow rate to flow to the cathode discharged gas passage 24 through the bypass passage 33.

As described above, in the range I other than at the extremely low load, particular control for increasing the turbine inflow flow rate Ft is not performed, and the bypass valve 32 is basically fully closed. Therefore, the required stack flow rate and the compressor flow rate target value Fco_t become approximately equal to each other, and these both increase with an increase in the required output (see FIG. 9(*a*) and FIG. 9(*f*)).

Then, in the range II, when the required output has reached Wreq1, the required compressor power exceeds the limit value Wml of the output of the compressor drive motor 54. Consequently, the shortage of the output of the compressor drive motor 54 for the required compressor power (corresponding to a hatched portion in FIG. 9(*c*)) can be covered by recovery power of the turbine 52. The recovery power of the turbine 52 that is required in this event will also be referred to as a "required turbine recovery power".

Therefore, in this case, in order to increase the recovery power of the turbine 52, hydrogen fuel supply to the catalyst combustor 36 is started and the amount of this supply is gradually increased as shown in FIG. 9(*d*). Consequently, the turbine inlet temperature Tt rises as shown in FIG. 9(*e*) so that it is possible to increase the turbine recovery power.

On the other hand, as described above, for increasing the turbine recovery power, it is suggested not only to raise the turbine inlet temperature Tt, but also to increase the turbine inflow flow rate Ft. However, at the stage of the range II, the air pressure is still not sufficiently high so that the pressure loss of the cathode system is large, and therefore, even if control to increase the turbine inflow flow rate Ft is performed, it is not possible to largely increase the recovery power of the turbine 52. Accordingly, also in this case, the bypass valve 32 is fully closed as shown in FIG. 9(*g*), and the required stack flow rate and the compressor flow rate target value Fco_t are approximately equal to each other and increase with an increase in the required output (see FIG. 9(*a*) and FIG. 9(*f*)).

Then, when the required output has reached Wreq2 in the range III, the generated electric power of the fuel cell stack 10 reaches the maximum power-generation electric power Wstmax.

Herein, when the required output has become the maximum power-generation electric power Wstmax or more, the generated electric power of the fuel cell stack 10 is insufficient for the required output, and therefore, it is necessary to reduce the accessory electric power such as the electric power of the compressor drive motor 54 so as to compensate for the shortage of the generated electric power of the fuel cell stack 10. Accordingly, in order to reduce the electric power consumption of the compressor drive motor 54, the limit value Wml of the compressor drive motor 54 is lowered (see FIG. 9(c)). On the other hand, in order to increase the recovery power by the turbine 52 for compensating for the power reduction of the compressor drive motor 54 due to the lowering of the limit value Wml, the hydrogen fuel supply amount through the combustion anode gas supply passage 64 is increased (see a hatched portion in FIG. 9(d)). Consequently, the turbine inlet temperature Tt rises (see FIG. 9(e)) so that the recovery power by the turbine 52 increases, and therefore, the difference between the required compressor power and the limit value Wml of the compressor drive motor 54 can be compensated by the recovery power by the turbine 52 (see a hatched portion in FIG. 9(c)).

At the stage of the range III, since the turbine outlet temperature has not reached the upper limit temperature, it is possible to increase the turbine recovery power by raising the temperature, not by increasing the bypass amount. Therefore, in this case, the bypass valve 32 is fully closed as shown in FIG. 9(g), and the required stack flow rate and the compressor flow rate target value Fco_t are approximately equal to each other and increase with an increase in the required output (see FIG. 9(a) and FIG. 9(f)).

Then, the range IV is a range where the required output becomes Wreq3 to Wreq4. That is, it is the range where the load is higher compared to the ranges I to III. In the range IV, the situation is such that the required output exceeds the outputtable electric power of the fuel cell stack 10 and is not satisfied even by setting the limit value Wml of the compressor drive motor 54 to zero, i.e. even by setting the electric power supply to the compressor drive motor 54 to zero (situation where regeneration is required).

In the range IV, in order to ensure the power of the compressor 50 and satisfy the required output, the compressor drive motor 54 is operated in the regeneration mode by the recovery power of the turbine 52 so as to perform power generation. Consequently, the shortage of the electric power for the required output is compensated by the power generation by the compressor drive motor 54. Therefore, as shown in FIG. 9(d) and FIG. 9(e), the hydrogen fuel supply amount to the catalyst combustor 36 through the combustion anode gas supply passage 64 is further increased to raise the turbine inlet temperature Tt, thereby increasing the recovery power by the turbine 52.

On the other hand, in this embodiment, control to increase the turbine inflow flow rate Ft is not performed even at the stage of the range IV. As shown in FIG. 9(g), the bypass valve 32 is fully closed. Therefore, the required stack flow rate and the compressor flow rate target value Fco_t are approximately equal to each other and increase with an increase in the required output (see FIG. 9(a) and FIG. 9(f)).

Further, the range V is a range where the required output becomes Wreq4 to Wreq5. In this range, since the required output is the greatest compared to the ranges I to IV, the limit value Wml of the compressor drive motor 54 is further lowered. That is, the power generation amount of the fuel cell stack 10 becomes further insufficient for the required output.

However, in the range V, as shown in FIG. 9(e), the turbine inlet temperature Tt has reached the allowable upper limit temperature Tt_tmax that is determined in terms of the heat-resistant temperatures of components and so on. Therefore, it is required to increase the recovery power by the turbine 52 while preventing the turbine inlet temperature Tt from rising more.

Therefore, in this embodiment, the compressor flow rate Fco is increased to more than the required stack flow rate while increasing the hydrogen fuel supply amount to the catalyst combustor 36. Then, along with this, the opening degree of the bypass valve 32 is increased to allow excess air for the required stack flow rate to flow into the bypass passage 33 (see FIG. 9(f) and FIG. 9(g)).

Consequently, through the bypass passage 33, the flow rate exceeding a cathode discharged gas flow rate that is primarily necessary for combusting a hydrogen fuel supply amount to the catalyst combustor 36 can be supplied to the turbine 52. Accordingly, it is possible to improve the recovery power from the turbine 52 by increasing the turbine inflow flow rate Ft while suppressing a rise in the turbine inlet temperature Tt. Therefore, the electric power that is generated by the compressor drive motor 54 based on the recovery power of the turbine 52 can be further improved to satisfy the required output that is increased with an increase in the load.

Particularly, in this embodiment, excess air for the required stack flow rate can be supplied to the catalyst combustor 36 through the bypass passage 33 by increasing the opening degree of the bypass valve 32. Consequently, the excessive flow rate for the required stack flow rate is prevented from flowing to the aftercooler 28 (see FIG. 1).

As described above, in this embodiment, when the turbine inlet temperature Tt has reached the allowable upper limit temperature Tt_tmax as in the range V, the gas supply amount to the turbine 52 is increased by increasing the compressor flow rate Fco and the opening degree of the bypass valve 32, so that it is possible to improve the recovery power from the turbine 52 while suppressing a rise in the turbine inlet temperature Tt.

Particularly, in this embodiment, it is preferable to increase the turbine inflow flow rate Ft by increasing the compressor flow rate Fco and the opening degree of the bypass valve 32 when the turbine inlet temperature Tt has reached the allowable upper limit temperature Tt_tmax and the air pressure is high to a certain extent as in the range V. Hereinafter, this reason will be described in detail.

Figure 10:
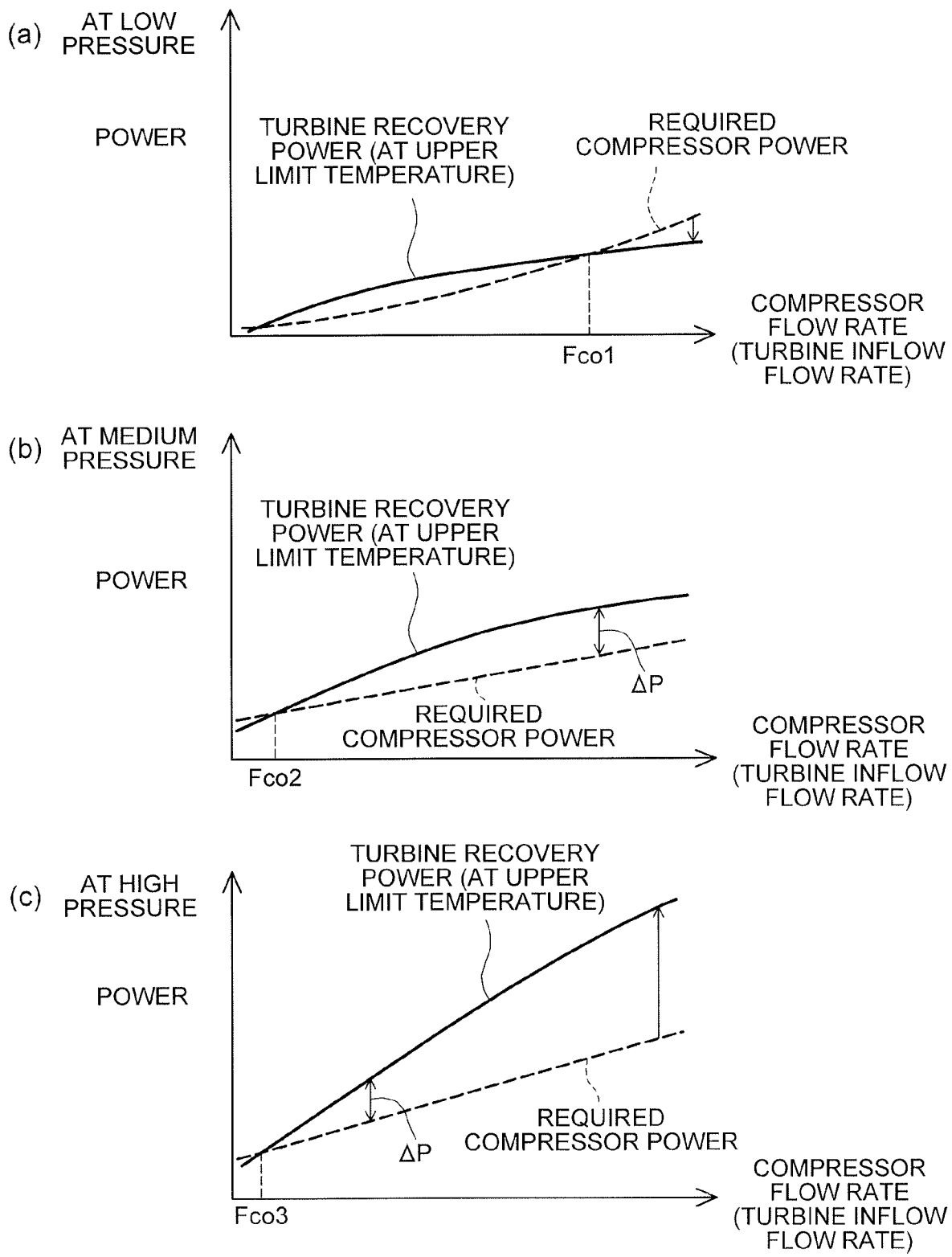
FIG. 10 is a diagram showing the relationship between the flow rate and the recovery power by a turbine according to the pressure when the turbine inlet temperature is an allowable upper limit temperature.

FIG. 10 is a diagram showing the relationship between the turbine inflow flow rate Ft, the recovery power by the turbine 52, and the compressor power according to the magnitude of the air pressure when the turbine inlet temperature Tt is the allowable upper limit temperature Tt_tmax. In the figure, the recovery power by the turbine 52 is indicated by a solid line, and the required compressor power is indicated by a broken line.

FIG. 10(a) shows a graph of turbine recovery power at low pressure (the pressure ratio target value Pc_t/Pai_d is set to the smallest value), FIG. 10(b) shows a graph of turbine recovery power at medium pressure (the pressure ratio target value Pc_t/Pai_d is set to the intermediate value), and FIG. 10(c) shows a graph of turbine recovery power at high pressure (the pressure ratio target value Pc_t/Pai_d is set to the greatest value).

As shown in FIG. 10(a), at low pressure, as described above, since the pressure loss of the cathode system becomes large, even if the compressor flow rate Fco is increased to increase the turbine inflow flow rate Ft, it is not possible to largely increase the recovery power by the turbine 52. On the other hand, the required compressor power increases with an increase in the compressor flow rate Fco, and when the compressor flow rate Fco has reached a predetermined value Fco1, the required compressor power starts to exceed the recovery power by the turbine 52. Therefore, at low pressure, the compressor flow rate Fco is controlled to be equal in value to the stack flow rate Fs, and the bypass valve 32 is fully closed so that supply of air to the catalyst combustor 36 through the bypass passage 33 is not performed.

Next, as shown in FIG. 10(b), at medium pressure, the increase amount of the recovery power by the turbine 52 relative to an increase in the turbine inflow flow rate Ft becomes greater compared to that at low pressure. Therefore, even when the compressor flow rate Fco is increased to a certain level, the recovery power by the turbine 52 can be increased, and it is possible to maintain a state where the recovery power exceeds the required compressor power. Accordingly, at medium pressure, the compressor flow rate Fco is adjusted to be greater than the stack flow rate Fs.

On the other hand, when adjusted in this way, if excess air for the stack flow rate Fs is allowed to flow to the aftercooler 28 of FIG. 1 as it is, the radiation amount of the aftercooler 28 becomes large so that it is necessary to increase the size of the aftercooler 28. Further, since the excess air is supplied to the fuel cell stack 10, there is a possibility that a problem such as overdrying or overvoltage of the fuel cell stack 10 may occur. In view of this, in this embodiment, the opening degree of the bypass valve 32 is increased so that the air discharged from the compressor 50 is directly supplied to the catalyst combustor 36 through the bypass passage 33.

Further, at medium pressure, the pressure loss of the cathode system occurs to a certain extent although smaller than that at low pressure. Therefore, when the turbine inflow flow rate Ft is increased beyond a certain level, the increase amount of the recovery power of the turbine 52 decreases. Therefore, at medium pressure, the compressor flow rate Fco is adjusted so as not to largely exceed the stack flow rate Fs, and the opening degree of the bypass valve 32 is limited accordingly.

Next, as shown in FIG. 10(c), at high pressure, the increase amount of the required compressor power relative to an increase in the compressor flow rate Fco becomes large. However, since the pressure loss of the cathode system is small at high pressure, the recovery power of the turbine 52 also largely increases relative to an increase in the turbine inflow flow rate Ft caused by the increase in the compressor flow rate Fco. Further, the increase amount of the recovery power of the turbine 52 caused by the increase in the compressor flow rate Fco largely exceeds the increase amount of the required compressor power. For example, when causing the recovery power of the turbine 52 to be greater than the required compressor power by $\Delta P$, this can be realized by the compressor flow rate Fco that is smaller at high pressure than at medium pressure (see FIG. 10(b) and FIG. 10(c)).

Therefore, at high pressure, in order to increase the recovery power of the turbine 52, the compressor flow rate Fco is increased as much as possible. Then, excessive air that is a surplus of the compressor flow rate Fco over the stack flow rate Fs is supplied to the catalyst combustor 36 through the bypass passage 33 by increasing the opening degree of the bypass valve 32 like at medium pressure. Consequently, it is possible to prevent the increase in the size of the aftercooler 28, the overdrying of the fuel cell stack 10, and so on.

The upper limit of the increase amount of the compressor flow rate Fco at high pressure is not particularly limited. However, in terms of preventing supply of excess air to the aftercooler 28 or the fuel cell stack 10 as much as possible, it is preferable to limit the increase amount of the compressor flow rate Fco so that the value of flow rate that is obtained by subtracting the stack flow rate Fs from the compressor flow rate Fco becomes equal to or less than the upper limit value of flow rate that can pass through the bypass valve 32.

Hereinafter, the open/close control of the bypass valve 32 that is characteristic in this embodiment will be briefly described.

Figure 11:
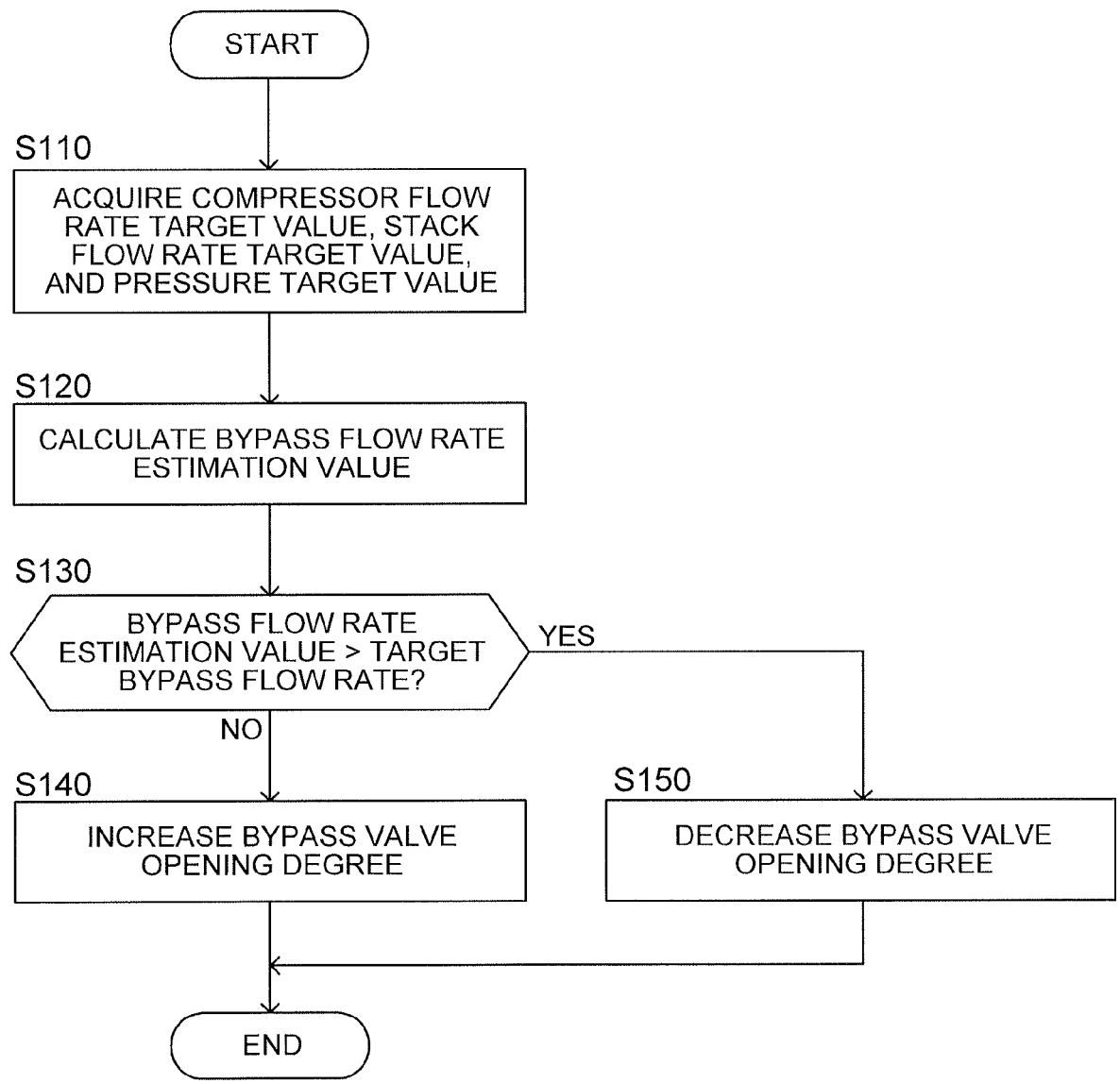
FIG. 11 is a flowchart that describes opening and closing of a bypass valve according to the first embodiment.

FIG. 11 is a flowchart that describes opening and closing of the bypass valve 32 in this embodiment.

As shown in the figure, at step S110, a compressor flow rate target value Fco_t, a stack flow rate target value Fs_t, and an air pressure target value Pc_t are acquired by the controller 20 and the various measuring devices.

Then, at step S120, using a pre-designed map, the controller 20 calculates a bypass flow rate estimation value Fb_e from the stack flow rate target value Fs_t and the air pressure target value Pc_t. The bypass flow rate estimation value Fb_e is calculated to be a greater value as the stack flow rate target value Fs_t is greater and as the air pressure target value Pc_t is greater. Further, the controller 20 calculates a target bypass flow rate Fb_t by subtracting the stack flow rate target value Fs_t from the compressor flow rate target value Fco_t.

At step S130, the controller 20 determines whether or not the bypass flow rate estimation value Fb_e is greater than the target bypass flow rate Fb_t. When the controller 20 has determined that the bypass flow rate estimation value Fb_e is equal to or less than the target bypass flow rate Fb_t, the controller 20 proceeds to step S140. At step S140, the controller 20 increases the opening degree of the bypass valve 32. On the other hand, when the controller 20 has determined at step S130 that the bypass flow rate estimation value Fb_e is greater than the target bypass flow rate Fb_t, the controller 20 proceeds to step S150. At step S150, the controller 20 decreases the opening degree of the bypass valve 32.

In this embodiment, it is configured that hydrogen is directly supplied from the high-pressure tank 60 to the catalyst combustor 36, but not limited thereto. For example, it may be configured that, in the anode-circulation-system fuel cell system, a portion of an anode discharged gas flowing in an anode circulation passage is supplied to the catalyst combustor 36.

Further, in the control of the fuel cell system 100 in this embodiment, as shown in FIG. 3, the stack current target value is used as a parameter that represents the load requirement of the system, but not limited thereto. Various other parameters such as an electric power target value and a voltage target value may each be used as long as it is a parameter that is correlated with the load amount in the load device 110.

According to the fuel cell system 100 and the method for controlling the fuel cell system 100 according to the first embodiment of the present invention described above, the following operations and effects are exhibited.

According to this embodiment, the fuel cell system 100 includes the fuel cell stack 10 being the fuel cell that is supplied with the anode gas and the cathode gas and generates electric power, the compressor 50 that supplies the cathode gas to the fuel cell stack 10, the turbine 52 that is supplied with the cathode discharged gas discharged from the fuel cell stack 10 and generates power, the compressor drive motor 54 as the electric motor that is connected to the compressor 50 and the turbine 52 and performs power running and regeneration, the catalyst combustor 36 as the combustor that is disposed between the fuel cell stack 10 and the turbine 52 and mixes and combusts the cathode gas and the anode gas, the aftercooler 28 as the cooler that cools the cathode gas that is supplied from the compressor 50 to the fuel cell stack 10, the bypass passage 33 that supplies the cathode gas from the upstream side of the aftercooler 28 to the catalyst combustor 36 by bypassing the aftercooler 28 and the fuel cell stack 10, and the bypass valve 32 disposed in the bypass passage 33.

According to this, excess air for power generation of the fuel cell stack 10, in the air discharged from the compressor 50, can be supplied to the catalyst combustor 36 through the bypass passage 33. Therefore, even when the flow rate of the compressor 50 is increased to improve the recovery power of the turbine 52, the excess air can be directly supplied to the catalyst combustor 36 through the bypass valve 32.

Consequently, it is possible to prevent the excess air for the power generation of the fuel cell stack 10 from flowing to the aftercooler 28 while covering the power of the compressor 50 and the power for regeneration of the compressor drive motor 54 by the recovery power of the turbine 52.

Therefore, by compensating for the electric power to the load of the fuel cell stack 10 using the recovery power of the turbine 52 so as to reduce the amount of electric power to be generated by the fuel cell stack 10, it is possible to suppress the maximum output performance of the fuel cell stack 10 and thus to reduce the size of the fuel cell stack 10.

As described above, even when the compressor flow rate Fco is increased for improving the recovery power by the turbine 52, excess air is supplied from the upstream side of the aftercooler 28 to the catalyst combustor 36 through the bypass passage 33. Consequently, while realizing an increase in the recovery power by the turbine 52, it is possible to suppress the inflow of a large amount of high-temperature air to the aftercooler 28 and thus to reduce the radiation amount in the aftercooler 28. Therefore, it is possible to reduce the size of the aftercooler 28 and the size of the radiator 77.

As described above, according to this embodiment, since it is possible to realize the size reduction of both the fuel cell stack 10 and the aftercooler 28, this contributes to the size reduction of the entire fuel cell system 100, so that even when the system installation space is limited such as when the fuel cell system 100 is installed in a vehicle, it can be dealt with.

Therefore, the fuel cell system 100 equipped with the compressor power supply mechanism 16 of this embodiment can also be suitably applied to the fuel cell stack 10, such as PEM, that operates at relatively low temperature.

In the fuel cell system 100 according to this embodiment, the controller 20 functions as a control unit that controls the bypass valve 32 based on the required output being the load requirement of the system. Consequently, with respect to the compressor flow rate Fco increased according to the recovery power by the turbine 52 that is required according to the required output, it is possible to allow excess air for the stack flow rate to flow into the bypass passage 33 more reliably.

Further, in the fuel cell system 100 according to this embodiment, the controller 20 functions as a control unit that controls the opening degree of the bypass valve 32 based on the pressure ratio target value being the target value of the pressure ratio Prc of the compressor 50 to the atmospheric pressure.

Consequently, since the opening degree of the bypass valve 32 is determined based on the pressure ratio target value being the target value of the pressure ratio Prc that is correlated with the compressor discharge temperature, it is possible to detect a high-load state (state where the required output is relatively high) of the system with high accuracy without directly detecting the compressor discharge temperature. Consequently, it is possible to increase the opening degree of the bypass valve 32 in time with the high-load state of the system more reliably, and as a result, it is possible to reduce the inflow of excess air to the aftercooler 28 more reliably.

Further, in the fuel cell system 100 according to this embodiment, the controller 20 functions as a control unit that increases, after the inlet temperature of the turbine 52 (turbine inlet temperature Tt) has reached the upper limit, the compressor flow rate Fco to more than the required stack flow rate being the flow rate that is required by the fuel cell stack 10.

Herein, the higher the turbine inlet temperature Tt, the greater the recovery power of the turbine 52. However, it is not possible to raise the turbine inlet temperature Tt beyond the allowable upper limit temperature Tt_tmax that is determined by taking into account the heat-resistant properties of components and so on. Therefore, when the turbine inlet temperature Tt has reached the allowable upper limit temperature Tt_tmax, the compressor flow rate Fco is increased to more than the required stack flow rate so as to increase the turbine inflow flow rate Ft while preventing the turbine inlet temperature Tt from rising more, so that the recovery power of the turbine 52 can be further increased. By increasing the opening degree of the bypass valve 32 in this event, the inflow of excess air to the aftercooler 28 can be properly prevented in the state where it would otherwise occur.

Further, in the fuel cell system 100 according to this embodiment, the controller 20 functions as a control unit that controls the compressor flow rate Fco based on the system required output (required output) that is determined based on the load connected to the fuel cell stack 10, and the outputtable electric power that can be output by the fuel cell stack 10.

Consequently, the turbine inflow flow rate Ft can be properly adjusted according to the required output and the outputtable electric power, so that it is possible to obtain the recovery power of the turbine 52 more properly.

In particular, by increasing the compressor flow rate Fco as the outputtable electric power becomes more insufficient for the required output, it is possible to appropriately compensate for the shortage of the generated electric power of the fuel cell stack 10 by the power that can be recovered from the turbine 52. By increasing the opening degree of the bypass valve 32 in this event, the inflow of excess air to the aftercooler 28 can be properly prevented in the state where it would otherwise occur.

Further, in the fuel cell system 100 according to this embodiment, the heat exchanged in the aftercooler 28 can be transferred to the fuel cell stack 10 via cooling water. Consequently, for example, in the situation where heat supply to the fuel cell stack 10 is required, such as during warm-up, the heat of high-temperature air discharged from the compressor 50 can be supplied to the fuel cell stack 10. This contributes to an improvement in the energy efficiency of the system.

Second Embodiment

Next, a fuel cell system in a second embodiment of the present invention will be described. The same symbols will be assigned to the same components as those in the first embodiment, thereby omitting a description thereof.

Figure 12:
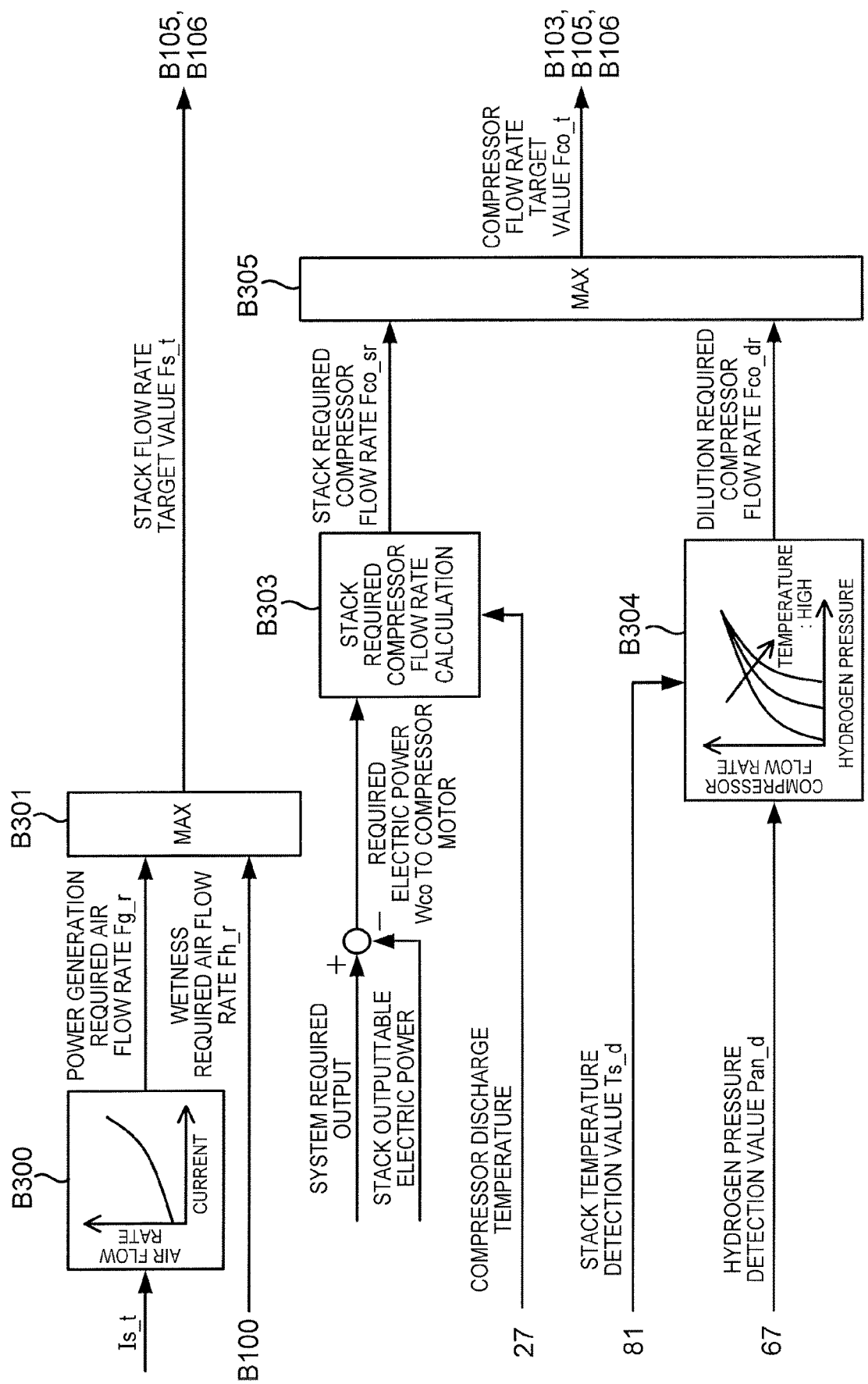
FIG. 12 is a block diagram showing a functional configuration example that calculates a target value of air flow rate to be supplied to a fuel cell and a target value of air flow rate to be discharged from a compressor, according to a second embodiment.

FIG. 12 is a block diagram showing functions of calculating a stack flow rate target value and a compressor flow rate target value Fco_t in this embodiment. In this embodiment, instead of inputting the pressure ratio target value Pc_t/Pai_d into the stack required compressor flow rate calculation block B303 as in the first embodiment, a compressor discharge temperature detection value Tc_d detected by the compressor discharge temperature sensor 27 is input into the stack required compressor flow rate calculation block B303.

In this embodiment, the stack required compressor flow rate calculation block B303 calculates a stack required compressor flow rate Fco_sr using a predetermined map based on an input required electric power Wco to compressor motor and the input compressor discharge temperature detection value Tc_d.

Figure 13:
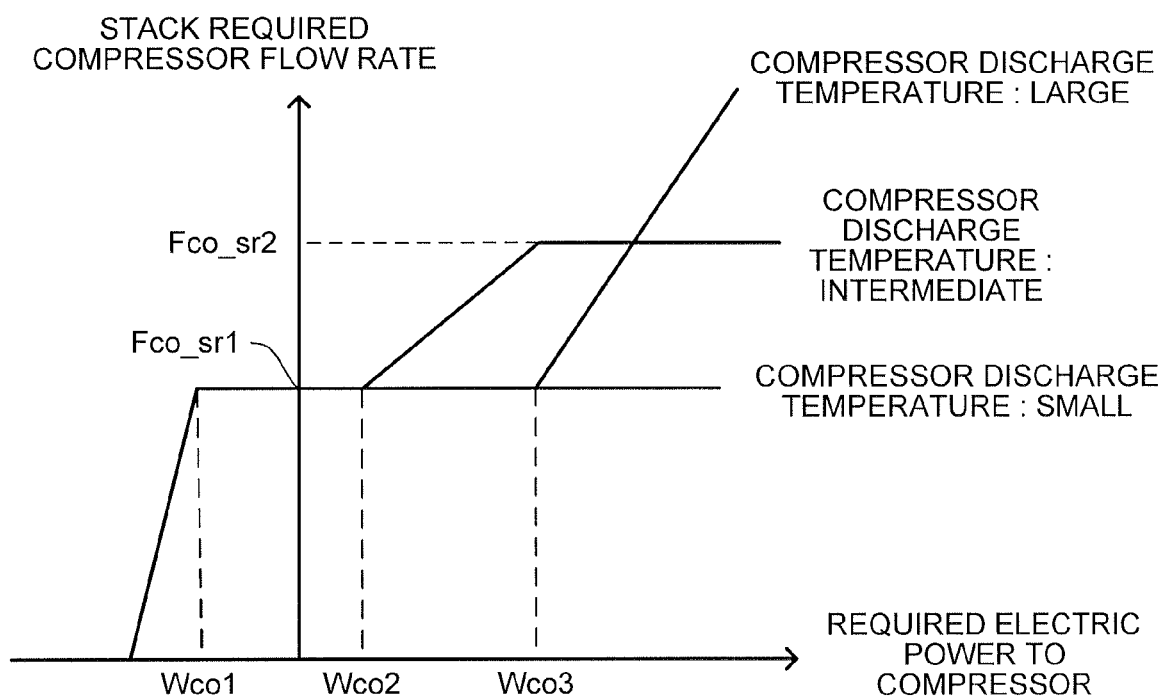
FIG. 13 is a map showing the relationship between the compressor required power-generation electric power and the stack required compressor flow rate according to the compressor discharge temperature.

FIG. 13 is a map showing the relationship between the required electric power Wco to compressor motor and the stack required compressor flow rate Fco_sr according to the compressor discharge temperature.

As shown in the figure, when the required electric power Wco to compressor motor takes a negative value (when the generated electric power of the fuel cell stack 10 is not insufficient), the stack required compressor flow rate Fco_sr is increased to a predetermined value Fco_sr1 until the required electric power Wco to compressor motor reaches a predetermined value Wco1 regardless of the value of the compressor discharge temperature detection value Tc_d. The predetermined value Fco_sr1 is a value corresponding to a stack flow rate that is determined according to a required electric power to be generated by the fuel cell stack 10. That is, in the state where the generated electric power is not insufficient as described above, the compressor drive motor 54 is operated in the power running mode so that it is not necessary to set a compressor flow rate that is greater than the flow rate based on the required electric power to be generated by the fuel cell stack 10, and therefore, it is intended to set the compressor flow rate corresponding to the stack flow rate that is determined according to the required electric power to be generated by the fuel cell stack 10.

On the other hand, when the required electric power Wco to compressor motor takes a positive value (when the generated electric power of the fuel cell stack 10 is insufficient), the stack required compressor flow rate Fco_sr is set according to the compressor discharge temperature detection value Tc_d.

First, when the compressor discharge temperature detection value Tc_d is set to the smallest value (at low temperature), the stack required compressor flow rate Fco_sr is set to the predetermined value Fco_sr1 without increasing the stack required compressor flow rate Fco_sr regardless of the magnitude of the required electric power Wco to compressor motor. The reason for preventing the stack required compressor flow rate Fco_sr from increasing beyond the predetermined value Fco_sr1 at low temperature as described above is that since the pressure loss of the cathode system becomes large at low temperature so that the recovery power by the turbine 52 becomes low, even if the compressor flow rate is increased to increase the turbine gas inflow flow rate, a large improvement in the recovery power by the turbine 52 is not expected.

Next, when the compressor discharge temperature detection value Tc_d is set to an intermediate value (at medium temperature) that is greater than that at low temperature, after the required electric power Wco to compressor motor has reached a predetermined value Wco2, the stack required compressor flow rate Fco_sr is increased to a predetermined value Fco_sr2 from the predetermined value Fco_sr1 that is based on the required electric power to be generated by the fuel cell stack 10.

The reason for increasing, at medium temperature, the stack required compressor flow rate Fco_sr beyond the predetermined value Fco_sr1 that is based on the required electric power to be generated by the fuel cell stack 10 as described above is to increase the turbine gas inflow flow rate so as to obtain regenerated electric power from the compressor drive motor 54, thereby eliminating the shortage of generated electric power. However, since the pressure loss of the cathode system is still large at medium temperature, the recovery power above a certain level is not expected even by largely increasing the turbine gas inflow flow rate, and therefore, in order to increase the compressor flow rate to the extent where it is possible to increase the recovery power by the turbine 52, the stack required compressor flow rate Fco_sr is increased to the predetermined value Fco_sr2. In this embodiment, as will be described later, with the increase of the stack required compressor flow rate Fco_sr, the opening degree of the bypass valve 32 is increased to prevent a cathode gas at a flow rate equal to or greater than that required by the fuel cell stack 10 from flowing to the aftercooler 28.

Further, when the compressor discharge temperature detection value Tc_d is set to the greatest value (at high temperature), after the required electric power Wco to compressor motor has reached a predetermined value Wco3, the stack required compressor flow rate Fco_sr is increased from the predetermined value Fco_sr1.

In this way, also at high temperature, the stack required compressor flow rate Fco_sr is increased beyond the predetermined value Fco_sr1 that is based on the required electric power to be generated by the fuel cell stack 10 so as to obtain regenerated electric power from the compressor drive motor 54. At high temperature, since the pressure loss of the cathode system is small, the recovery power by the turbine 52 can be increased beyond the certain level by largely increasing the turbine gas inflow flow rate.

Herein, also at high temperature, with the increase of the stack required compressor flow rate Fco_sr, the opening degree of the bypass valve 32 is increased to prevent a cathode gas at a flow rate equal to or greater than that required by the fuel cell stack 10 from flowing to the aftercooler 28.

The open/close control of the bypass valve 32 in this embodiment is the same as the opening degree control of the bypass valve 32 in the first embodiment described with reference to FIG. 11.

The fuel cell system 100 according to the second embodiment of the present invention described above exhibits the following operations and effects.

According to this embodiment, the controller 20 functions as a control unit that controls the opening degree of the bypass valve 32 based on the compressor discharge temperature being the temperature of air that is discharged from the compressor 50.

Consequently, the opening degree of the bypass valve 32 can be controlled to adjust the turbine inflow flow rate Ft according to the compressor discharge temperature that changes according to the load of the fuel cell stack 10. For example, by increasing the opening degree of the bypass valve 32 according to the compressor discharge temperature that becomes relatively high in a high-load state of the system, timing to increase the opening degree of the bypass valve 32 can be matched with the high-load state of the system more reliably. As a result, it is possible to reduce the inflow of excess air to the aftercooler 28 more reliably.

While the embodiments of the present invention have been described above, the above-described embodiments only show part of application examples of the present invention and are not intended to limit the technical scope of the present invention to the specific configurations of the above-described embodiments.

This application claims the priority based on Japanese Patent Application No. 2016-056453 filed with the Japanese Patent Office on Mar. 22, 2016, the entire contents of which is incorporated herein by reference.

The invention claimed is:

1. A fuel cell system comprising:
 a fuel cell configured to be supplied with an anode gas and a cathode gas and to generate electric power;
 a compressor configured to supply the cathode gas to the fuel cell;
 a turbine configured to be supplied with a cathode discharged gas discharged from the fuel cell and to generate power;
 an electric motor connected to the compressor and the turbine and configured to perform power running and regeneration;
 a combustor disposed between the fuel cell and the turbine and configured to mix and combust at least a portion of the cathode gas and/or the cathode discharged gas with the anode gas;
 a cooler configured to cool the cathode gas that is supplied from the compressor to the fuel cell;
 a bypass passage configured to supply the cathode gas from an upstream side of the cooler to the combustor by bypassing the cooler and the fuel cell;
 a bypass valve disposed in the bypass passage; and
 a controller programmed to control the bypass valve based on a system required output, where the system required output is an output electric power,
 wherein the controller is programmed to, when the system required output is equal to or greater than a predetermined output, where an inlet temperature of the turbine reaches an allowable upper limit temperature, increase an opening degree of the bypass valve according to an increase in the system required output.

2. The fuel cell system according to claim 1, wherein the controller is programmed to control the opening degree of the bypass valve based on a target value of a pressure ratio of an outlet pressure of the compressor to an atmospheric pressure.

3. The fuel cell system according to claim 1, wherein the controller is programmed to control a flow rate of the compressor based on the system required output that is determined based on a load connected to the fuel cell, and an outputtable electric power that is possible to be output by the fuel cell.

4. The fuel cell system according to claim 1, wherein the cooler is configured to perform heat exchange with the fuel cell.

5. The fuel cell system according to claim 1, wherein the system required output is output required according to a load of a load device to which generated electric power of the fuel cell is supplied.

6. The fuel cell system according to claim 1, wherein the controller is programmed to:
 set a limit value of work performed by the electric motor based on an outputtable electric power of the fuel cell;
 set a required turbine recovery power based on a difference between a required power of the compressor and the limit value;
 fully close the bypass valve, when the system required output is equal to or greater than a first required output and less than the predetermined output; and
 increase the opening degree of the bypass valve according to the increase in the system required output, when the system required output is equal to or greater than the predetermined output;
 wherein the first required output is the system required output where the required power of the compressor reaches the limit value,
 wherein the predetermined output is the system required output where the inlet temperature of the turbine reaches the allowable upper limit temperature.

* * * * *